United States Patent
Nietfeld et al.

(10) Patent No.: US 11,806,609 B2
(45) Date of Patent: Nov. 7, 2023

(54) CONTINUOUS CONTROLLER CALIBRATION

(71) Applicant: Valve Corporation, Bellevue, WA (US)

(72) Inventors: Scott Douglas Nietfeld, Bellevue, WA (US); Jeffrey George Leinbaugh, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 154 days.

(21) Appl. No.: 17/164,475

(22) Filed: Feb. 1, 2021

(65) Prior Publication Data

US 2021/0178251 A1 Jun. 17, 2021

Related U.S. Application Data

(63) Continuation of application No. 16/289,259, filed on Feb. 28, 2019, now Pat. No. 10,905,946.

(51) Int. Cl.
| | |
|---|---|
| *A63F 13/24* | (2014.01) |
| *G06F 3/038* | (2013.01) |
| *A63F 13/218* | (2014.01) |
| *A63F 13/214* | (2014.01) |
| *A63F 13/44* | (2014.01) |

(52) U.S. Cl.
CPC ............ *A63F 13/214* (2014.09); *A63F 13/24* (2014.09); *A63F 13/44* (2014.09); *G06F 3/038* (2013.01); *A63F 13/218* (2014.09); *A63F 2300/1043* (2013.01)

(58) Field of Classification Search
None
See application file for complete search history.

(56) References Cited

U.S. PATENT DOCUMENTS

| | | |
|---|---|---|
| 6,492,979 B1 | 12/2002 | Kent |
| 6,570,078 B2 | 5/2003 | Ludwig |
| 8,754,746 B2 | 6/2014 | Lukas et al. |
| 9,831,870 B2 | 11/2017 | Buttolo et al. |
| 9,950,256 B2 | 4/2018 | Lim |
| 10,427,035 B2 | 10/2019 | Schmitz et al. |
| 10,441,881 B2 | 10/2019 | Burgess et al. |
| 10,635,202 B1 | 4/2020 | Nietfeld |

(Continued)

FOREIGN PATENT DOCUMENTS

| | | |
|---|---|---|
| JP | 2010191834 A | 9/2010 |
| KR | 101790947 B1 | 10/2017 |

(Continued)

OTHER PUBLICATIONS

SlagCoin Instruction Manual for a Joystick Controller "SlagCoin Appendix—Joystick Controller" last updated Feb. 25, 2009 www.slagcoin.com/joystick.html 52 pages.

(Continued)

*Primary Examiner* — Peter J Iannuzzi
(74) *Attorney, Agent, or Firm* — Lee & Hayes, P.C.

(57) ABSTRACT

A method including determining a range of values for a proximity sensor, receiving proximity data from the proximity sensor, decaying a limit associated with a maximum value, decaying a limit associated with a minimum value, determining a range of values detected by the proximity sensor, and determining an updated scale factor for the proximity sensor.

20 Claims, 12 Drawing Sheets

(56) References Cited

U.S. PATENT DOCUMENTS

| | | | |
|---|---|---|---|
| 10,905,946 B2* | 2/2021 | Nietfeld | ............... G06F 3/014 |
| 2005/0130742 A1 | 6/2005 | Feldman et al. | |
| 2006/0111180 A1 | 5/2006 | Cheng | |
| 2007/0032967 A1 | 2/2007 | Feen et al. | |
| 2008/0111788 A1 | 5/2008 | Rosenberg et al. | |
| 2008/0261695 A1 | 10/2008 | Coe | |
| 2009/0205878 A1 | 8/2009 | Taylor | |
| 2010/0134423 A1 | 6/2010 | Brisebois et al. | |
| 2010/0164901 A1 | 7/2010 | Chen et al. | |
| 2010/0201650 A1 | 8/2010 | Son | |
| 2011/0009193 A1 | 1/2011 | Bond et al. | |
| 2011/0009195 A1 | 1/2011 | Porwal | |
| 2011/0084932 A1* | 4/2011 | Simmons | ............ G06F 3/0418 345/173 |
| 2011/0118025 A1 | 5/2011 | Lukas et al. | |
| 2011/0248948 A1 | 10/2011 | Griffin | |
| 2012/0038496 A1 | 2/2012 | Edwards | |
| 2013/0100021 A1 | 4/2013 | Larsen et al. | |
| 2014/0005809 A1 | 1/2014 | Frei et al. | |
| 2014/0210257 A1 | 7/2014 | Buttolo | |
| 2015/0130478 A1 | 5/2015 | Erkens | |
| 2016/0089610 A1 | 3/2016 | Boyle et al. | |
| 2016/0246369 A1 | 8/2016 | Osman | |
| 2016/0274761 A1 | 9/2016 | Alonso Ruiz | |
| 2016/0357765 A1 | 12/2016 | Kim et al. | |
| 2017/0189800 A1 | 7/2017 | Crain | |
| 2017/0369288 A1 | 12/2017 | Fulton et al. | |
| 2018/0055434 A1 | 3/2018 | Cheung et al. | |
| 2018/0262991 A1 | 9/2018 | Rao et al. | |
| 2018/0264357 A1 | 9/2018 | Dalton et al. | |
| 2018/0272232 A1 | 9/2018 | Campbell | |
| 2018/0335853 A1* | 11/2018 | Chiu | ....................... A63F 13/24 |
| 2019/0042965 A1 | 2/2019 | Clarke et al. | |
| 2019/0137993 A1 | 5/2019 | Bertrand et al. | |
| 2019/0290999 A1 | 9/2019 | Bradner et al. | |
| 2019/0325651 A1 | 10/2019 | Bradner et al. | |
| 2020/0225768 A1 | 7/2020 | Nietfeld | |
| 2020/0276497 A1 | 9/2020 | Nietfeld et al. | |
| 2020/0300598 A1 | 9/2020 | Kim et al. | |
| 2020/0393922 A1 | 12/2020 | Nietfeld | |

FOREIGN PATENT DOCUMENTS

| | | |
|---|---|---|
| WO | WO2017027632 A1 | 2/2017 |
| WO | WO2020131302 A1 | 6/2020 |

OTHER PUBLICATIONS

WICO Corporation Consumer Division Manual for "WICO Command Control" Trackball controller, 1982, 6 pages.

Gagnon, "Continuous compensation of binary-weighted DAC nonlinearities in bandpass delta-sigma modulators", retrieved on Jan. 13, 2020 at <<https://curve.carleton.calsystemlfiles/etd/dbb5c4c1-6a58-41e8-8869-3911f4cbaea7/etd_pdf/d7e24c1fabd103c3b6bbb00142382d99/gagnon-continuouscompensationofbinaryweIghteddac.pdf>>, Ottawa-Carleton Institute for Electrical and Computer Engineering, 2008, 75 pages.

Office Action for U.S. Appl. No. 16/826,818, dated Sep. 30, 2020, Nietfield, "Dynamic Sensor Assignment", 10 Pages.

Office Action for U.S. Appl. No. 16/289,259, dated Jun. 1, 2020, Nietfeld, "Continuous Controller Calibration", 7 pages.

The PCT Search Report and Written Opinion dated Jan. 30, 2020 for PCT Application No. PCT/US2019/062830, 11 pages.

The PCT Search Report and Written Opinion dated Apr. 16, 2020 for PCT Application No. PCT/US20/15435, 15 pages.

The International Report on Premliminary Patentability dated Sep. 10, 2021, for PCT App No. PCT/US20/15435.

Extended European Search Report dated Oct. 21, 2022 for European Patent Application No. 20762861.1 14 pages.

Extended European Search Report dated Jul. 25, 2022 for European Patent Application No. 19899112.7, 28 pages.

\* cited by examiner

CONTINUOUS CONTROLLER CALIBRATION

CROSS REFERENCE TO RELATED APPLICATION

This U.S. patent application is a continuation of and claims priority to co-pending and commonly assigned U.S. patent application Ser. No. 16/289,259, entitled "CONTINUOUS CONTROLLER CALIBRATION," and filed on Feb. 28, 2019, the entirety of which is incorporated herein by reference.

BACKGROUND

Handheld controllers are used in an array of architectures for providing input, for example, to a computing device. For instance, handheld controllers are utilized in the gaming industry to allow players to interact with a personal computing device executing a gaming application, a game console, a game server, and/or the like. In some instances, handheld controllers may find use in virtual reality (VR) environments and may mimic natural interactions such as grasping, throwing, squeezing, etc. While current handheld controllers provide a range of functionality, further technical improvements may enhance user experience.

DETAILED DESCRIPTION

Figure 1:
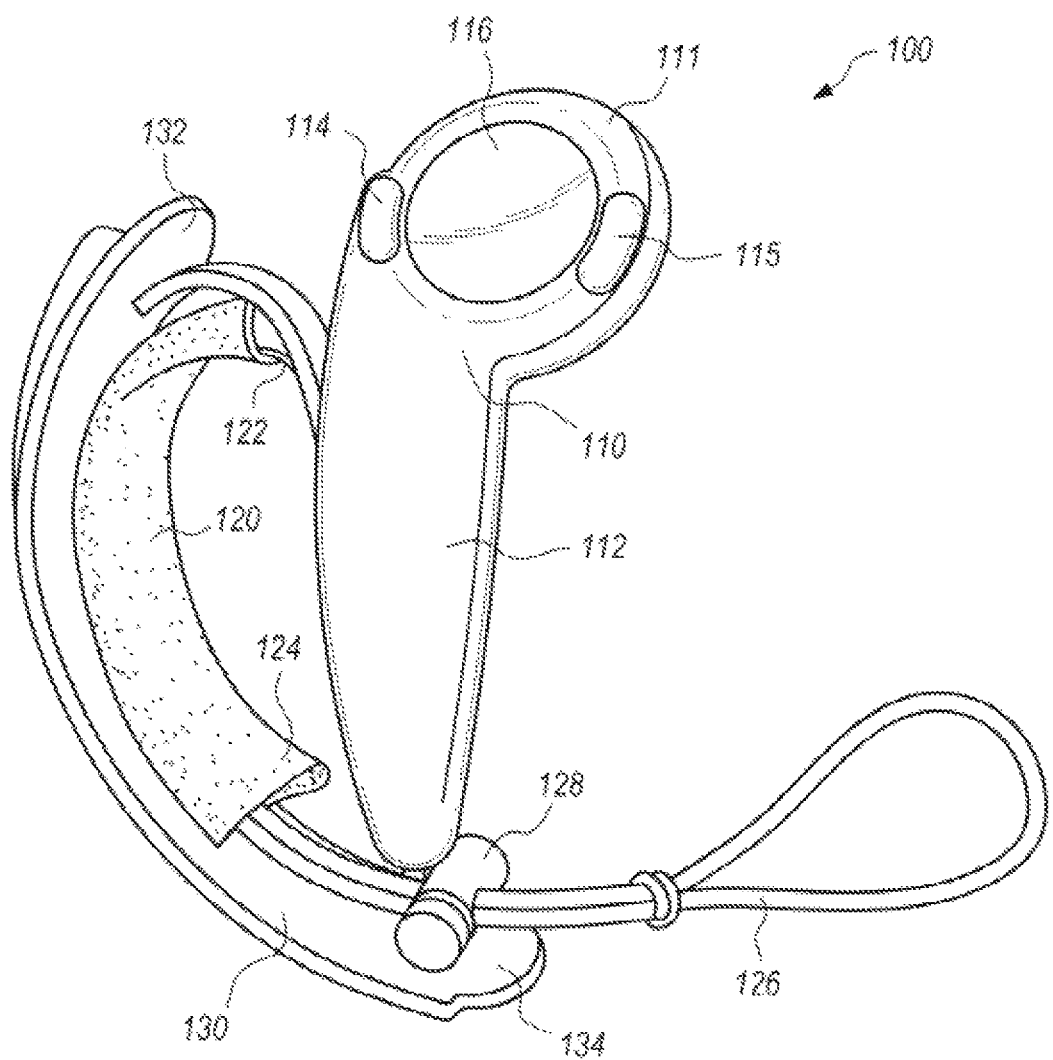
FIG. 1 depicts a controller with a hand retainer in an open position according to an example embodiment of the present disclosure.

Described herein are, among other things, handheld controllers having touch-sensitive controls and/or methods for continuously calibrating the touch-sensitive controls. In some instances, handheld controllers described herein may control a device (e.g., a television, audio system, personal computing device, game console, etc.) to engage in video game play and/or the like. The handheld controllers may include one or more controls such as joysticks, trackpads, trackballs, buttons, or other controls operable by a user of the handheld controller. Additionally, the handheld controllers may include sensors configured to detect a presence, proximity, location, and/or gesture of the user. For instance, the handheld controllers may include a proximity sensor configured to detect a proximity of one or more objects, such as a finger of the user, or portions of the finger, relative to the handheld controller. However, the handheld controller may include an infrared sensor, a sensor that utilizes acoustic soundwaves, and/or any other type of sensor configured to detect touch input at the handheld controller and/or a proximity of one or more objects relative to the handheld controller.

In some instances, the proximity sensor may include an array of proximity sensors or capacitive pads arranged in rows, columns, a grid, and/or group(s). The capacitive pads may generate proximity data (e.g., capacitance values) that correspond to a proximity of the finger(s) relative to the handheld controller. The handheld controller may continuously monitor the capacitance values detected by individual capacitive pads to associate the capacitance values with a touch or a relative hover of the finger above the handheld controller. For instance, the proximity data may indicate that one or more fingers contact (e.g., physically touch) the handheld controller and/or may indicate that one or more fingers hover above the handheld controller. The proximity data may also be used to determine a distance the finger hovers above, or relative to, the handheld controller. In other words, if the finger(s) hovers above the handheld controller, the proximity data may indicate how far or close the fingers are disposed above (or from) the handheld controller. Using a range of capacitance values, the relative position of the finger (i.e., between being fully extended and touching the handheld controller) may be determined.

In some instances, the capacitive pads may be associated with particular fingers of the user (e.g., middle, ring, pinky, etc.) or certain portions of the finger (e.g., fingertip). Through arranging the capacitive pads in groups, or associating certain capacitive pads with fingers, the handheld controller may map the capacitance values to certain fingers of the user (or portion of the finger).

The handheld controller may include one or more processors that communicatively couple to the proximity sensor to receive and/or analyze the proximity data. In instances where the proximity sensor comprises capacitive pads, the one or more processors may receive, from individual capacitive pads, the proximity data (e.g., a capacitance value). The one or more processors, or other logic (e.g., software, hardware, firmware, etc.), may analyze the proximity data to determine a detected capacitance value and associate this capacitance value with a relative proximity of the finger to the handheld controller. In other words, the handheld controller may utilize the proximity data to determine the presence of the finger and/or a location (or "position") of the finger(s). Additionally, the handheld controller may receive the proximity data from individual capacitive pads and may associate, or group, the proximity data with particular fingers of the user. Associating the proximity data with certain fingers may allow a gaming console, remote system, head-mounted display, virtual reality environment, or other computing devices and/or handheld controller(s) to generate image data depicting a hand gesture of the user.

As an example, the proximity data may indicate that the user grips the handheld controller with their middle finger and ring finger, but not with his or her pinky finger. The proximity data may also indicate a relative proximity of the pinky finger to the handheld controller (i.e., how far the pinky finger is disposed from the handheld controller). Utilizing the proximity data, and associating the proximity data with certain fingers of the user, the handheld controller (or another communicatively coupled device) may generate an indication (or other information) representing the finger positions. For instance, a gaming console may utilize the indication generate image data corresponding to a hand gesture showing the user holding an object with their middle finger and ring finger, but not with the pinky finger.

The handheld controller (or another communicative coupled device) may continuously calibrate the proximity sensor to accommodate for varying grips (e.g., different hand size, different finger size, etc.) and/or varying environmental conditions (e.g., humidity, temperature, etc.). For instance, the handheld controller may continuously monitor the proximity data to associate capacitance values with finger positions of the user. As an example, the detected proximity data (e.g., the capacitance values) may vary depending on the grip of the user, such as how the user holds the handheld controller, what game the user plays, and/or physical features of the hand of the user (e.g., length of finger, width of finger, etc.). In some instances, continuously calibrating the proximity sensor may include determining a range of capacitance values detected by individual capacitive pads.

The range of capacitance values may include a capacitance value associated with the finger touching the handheld controller and a capacitance value associated with the finger being fully extended from the handheld controller. In some instances, these capacitance values may correspond to a maximum capacitance value and a minimum capacitance value, respectively. Knowing the range of capacitance values for individual capacitive pads allows for subsequent capacitance values to be normalized, which in turn, may be used to determine finger position. Individual capacitive pads of the proximity sensor may include a maximum capacitance value and a minimum capacitance value, such that subsequent capacitance values received from individual capacitive pads may be normalized. That is, using the range of capacitance values, the handheld controller, or another communicatively coupled device, may continuously determine a scale factor and/or a bias associated with the capacitive pad. The scale factor and/or bias may be used to normalize (or calibrate) the capacitance values received at individual capacitive pads and/or normalize capacitance values received across capacitive pads of the proximity sensor. In some instances, the bias, scale factor, and/or range of capacitance values for individual capacitive pads may vary as the capacitive pads may respond differently and/or generate different capacitance values.

As an example, the capacitance values detected at the capacitive pads may depend on a size of the capacitive pad and/or manufacturing conditions. Calculating the scale factor and/or knowing the bias for individual capacitive pads allows for the capacitance values to be normalized with capacitance values received from other capacitive pads of the proximity sensor. The normalization and/or calibration of the capacitive pads in relation to one another may accurately determine hand gestures performed by the user.

The capacitance values detected by the capacitive pads of the proximity sensor may vary throughout a gameplay experience, such as if the hand of the user becomes moist (e.g., sweaty). For instance, the proximity data measured or detected by the capacitive pads may change, for instance, as the hands of the user become damp, as the humidity increases within an environment, and/or as the user adjusts his or her grip. Consequently, the range of the capacitance values detected by a given capacitive pad may change. The bias and scale factor may correspondingly change. To accurately portray hand gestures of the user, the handheld controller may decay a limit associated with the maximum capacitance value and/or a limit associated with the minimum capacitance value. In some instances, based at least in part on receiving capacitance values, the handheld controller may continuously decay the maximum capacitance value and/or the minimum capacitance value towards the detected capacitance values. In doing so, the range of capacitance values may continuously vary such that the range of capacitance values correspond to the capacitance values detected at the proximity sensor. In some instances, if the handheld controller does not detect a capacitance value within a predetermined range of the maximum capacitance value for a threshold amount of time, number of frames, or number of counts, the maximum capacitance value may decay. For instance, the predetermined range of the maximum capacitance value may be a quarter of the range of the capacitance values detected by the handheld controller (i.e., between the maximum capacitance value and the minimum capacitance value), and if the handheld controller does not detect a capacitance value within the predetermined range of the maximum capacitance value, the maximum capacitance value may decay towards the detected capacitance values. In other words, if the capacitance value(s) is/are not within the predetermined range of the maximum capacitance value, the maximum capacitance value may decay towards the minimum capacitance value. In other instances, if an average capacitance value determined over a predetermined amount of time, number of frames, or number of counts, is not within the predetermined range of the maximum capacitance value, the maximum capacitance value may decay. As an example, if a finger becomes damp, the handheld controller may observe a decrease in detected capacitance values. The maximum capacitance value may decay towards the minimum capacitance value to update or determine a new maximum capacitance value. As the maximum capacitance value is associated with an object (e.g., finger) touching the handheld controller, by decaying the maximum capacitance value, the handheld controller may accurately determine finger positions. Decaying the maximum capacitance value may also be used to determine an updated range of capacitance values, an updated bias, and/or an updated scale factor for individual capacitive pads of the proximity sensor.

The minimum capacitance value may similarly decay. That is, based at least in part on receiving capacitance values, the handheld controller may continuously decay the minimum capacitance value towards the detected capacitance values such that the range of capacitance values varies to correspond to the capacitance values detected at the proximity sensor. For instance, if the handheld controller does not detect a capacitance value within a predetermined range of the minimum capacitance value for a threshold amount of time, number of frames, or number of counts, the minimum capacitance value may decay. In some instances, the predetermined range of the minimum capacitance value may be a quarter of the range of the capacitance values detected by the handheld controller, and if the handheld controller does not detect a capacitance value within the predetermined range of the minimum capacitance value, the minimum capacitance value may decay. In other instances, if an average of the capacitance values detected over a previous amount of time, number of frames, or number of counts, is not within the predetermined range of the minimum capacitance value, the minimum capacitance value may decay. As the minimum capacitance value is associated with an object (e.g., finger) being fully extended from the handheld controller, by decaying the minimum capacitance value, the handheld controller (or another communicatively coupled device) may accurately determine finger positions. Decaying the minimum capacitance value may also be used to determine an updated range of capacitance values, an updated bias, and/or an updated scale factor for individual capacitive pads of the proximity sensor.

In some instances, an amount the maximum capacitance value and/or an amount the minimum capacitance value decays may be based on one or more variable decay rates, a range of capacitance values detected over a predetermined past number of frames, and/or a range of capacitance values between the maximum capacitance value and the minimum capacitance value. For instance, an amount of the decay may be based on a percentage of the difference between the detected capacitance value and the range of capacitance values detected over the predetermined past number of frames or a percentage of the difference between the detected capacitance value and the range of capacitance values between the maximum capacitance value and the minimum capacitance value. In other instances, the amount of the decay may be based on a percentage of the difference between the detected capacitance value and the maximum capacitance value or the minimum capacitance value, respectively. In other instances, the decay, or the variable decay rate, may be optimized to accurately associate the proximity of the finger with the maximum capacitance value and the minimum capacitance value, respectively. In some instances, decaying the maximum capacitance value and the minimum capacitance value may be limited such that the minimum capacitance value and the maximum capacitance value are separated by a threshold amount.

The rate at which the maximum capacitance value or the minimum capacitance value decays may depend on a volatility and/or a variability of the measured capacitance values. For instance, if a large variability exists between the capacitance values detected over the predetermined past number of frames, the maximum capacitance value or the minimum capacitance value may decay at a faster rate, as compared to if a small variability exists between the capacitance values detected over the predetermined past number of frames. For instance, if a first user has a maximum capacitance value and a minimum capacitance value associated with his or her grip, and a second user operates the handheld controller, a large variability may exist between the maximum capacitance value and/or the minimum capacitance value of the first user and the second user. Here, because of this disparity (or large variability), or if the disparity is greater than a threshold, the rate of decay may take this into account and decay the maximum capacitance value and/or the minimum capacitance value at a faster rate. Additionally, or alternatively, the rate at which the maximum capacitance value or minimum capacitance value decays may depend on a number of capacitance values received by the handheld controller. For instance, if the user rapidly taps their fingers on the handheld controller, the handheld controller may decay or converge the maximum capacitance value (or limit) and/or the minimum capacitance value (or limit) to the detected capacitance values at a faster rate and if the user does not rapidly tap the handheld controller.

Accordingly, throughout a gameplay experience, decaying and continuously calibrating the capacitive pads of the proximity sensor may adjust to the grip of the user and accommodate for environmental factors to accurately determine finger position. In other words, failing to decay the maximum capacitance value, or a limit associated with the maximum capacitance value, may result in not accurately associating a received capacitance value with the finger touching the handheld controller. That is, the handheld controller may not compare the capacitance value to an updated maximum capacitance value associated with the finger touching the handheld controller. Similarly, failing to decay the minimum capacitance value, or a limit associated with the minimum capacitance value, may result in not accurately associating a received capacitance value with the finger being fully extended from the handheld controller. That is, the handheld controller may not compare the capacitance value to an updated minimum capacitance value associated with the finger being fully extended from the handheld controller. Moreover, while the above discussion is with regard to a particular capacitive pad, the handheld controller may simultaneously determine the range of capacitance values, the bias, the scale factor, the decay, and/or the decay rate for each capacitive pad of the proximity sensor for each frame displayed in a VR environment.

As a result of decaying the maximum capacitance value and/or the minimum capacitance value, in some instances, the handheld controller may detect capacitance values that are greater than or less than the maximum capacitance value and/or the minimum capacitance value, respectively. In other words, through continuously updating the maximum capacitance value and/or the minimum capacitance value, the handheld controller may receive capacitance values that are greater than the determined maximum capacitance value and/or may receive capacitance values lower than the determined minimum capacitance value. As an example, as the fingers of the user become less damp, or if a different user operates the handheld controller, the handheld controller may detect increased capacitance values and the capacitance values may "overshoot" or exceed the maximum capacitance value and/or the minimum capacitance value. In such instances, the maximum capacitance value and/or the minimum capacitance value may extend and make up for this difference based at least in part on an average of the capacitance values detected over a past number of frames. Additionally, the rate at which the maximum capacitance value and/or the minimum capacitance value updates may be based on a growth constant as well as the average capacitance values detected over the past number of frames. In doing so, the handheld controller (or another communicatively coupled device) may determine an updated maximum capacitance value and/or the minimum capacitance, an updated bias, an updated scale factor, and so forth.

Additionally, in some instances, the handheld controller may also sense, detect, or measure, via a pressure sensor, an amount of force associated with touch input at the handheld controller. For instance, as a finger of a user presses against the handheld controller, a portion of the controller, such as a cover disposed above the pressure sensor, may deflect to contact the pressure sensor. The pressure sensor may couple to the one or more processors such that touch input may result in force data being provided to the one or more processors. In some instances, the pressure sensor may comprise a force-sensing resistor (FSR) sensor, a piezoelectric sensor, a load cell, a strain gauge, a capacitive-type pressure sensor that measures capacitive force measurements, or any other type of pressure sensor. Additionally, in some instances, the proximity data and the force data may be interpreted together and associated with a predefined command or hand gesture (e.g., squeezing).

In light of the above, the handheld controller may dynamically calibrate the proximity sensor to adapt to changing grips of a user(s) and/or environmental conditions, for instance. In doing so, the handheld controller may decay capacitance values associated with finger touching the handheld controller (e.g., the maximum capacitance value) and the finger being fully extended from the handheld controller (e.g., the minimum capacitance value). Through determining a range of capacitance values, a bias, a scale factor, and so forth, upon receiving subsequent proximity data, the handheld controller may determine the relative location and/or proximity of the finger to the handheld controller. In other words, to accurately portray hand gestures of the user in gameplay (e.g., a VR environment), the handheld controller (or the a communicatively coupled device) may continuously calibrate the proximity sensor.

FIG. 1 illustrates a front view of an example controller 100 that may include one or more touch-sensitive controls. In some instances, the controller 100 may be utilized by an electronic system such as a VR video gaming system, robot, weapon, or medical device.

As illustrated, the controller 100 may include a controller body 110 having a handle 112 and a hand retainer 120. The controller body 110 may include a head disposed between the handle 112 and a distal end 111 of the controller 100, which may include one or more thumb-operated controls 114, 115, 116. For example, a thumb-operated control may include a tilting button, and/or any other button, knob, wheel, joystick, or trackball conveniently manipulated by a thumb of a user during normal operation when the controller 100 is held in the hand of the user. In some instances, the handle 112 may include a substantially cylindrical tubular housing. However, in this context, a substantially cylindrical shape need not have constant a diameter or a circular cross-section.

The handle 112 may include a proximity sensor having a plurality of proximity sensors or capacitive pads spatially distributed at least partially or completely around an outer surface of the handle 112. For example, the capacitive pads may be spatially distributed beneath the outer surface of the handle 112 and/or may be embedded under the outer surface of the handle 112. The capacitive pads may be responsive to a user touching, gripping, or grasping the handle 112 to identify the presence, position, proximity, and/or gesture of one or more fingers of the user. For instance, the capacitive pads may be responsive to one or more fingers hovering above the handle 112 and may generate proximity data (e.g., capacitance values) indicating the proximity of the fingers above the handle 112. In some instances, the proximity data may indicate a presence, location, and/or proximity of the finger(s) relative to the controller 100. The proximity data may be utilized by the controller 100 and/or other communicatively coupled device(s) to generate hand gestures. To detect the proximity of the fingers, the outer surface of the handle 112 may comprise an electrically insulative material.

The hand retainer 120 may couple to the controller 100 to bias a palm of the user against the outside surface of the handle 112. In FIG. 1, the hand retainer 120 is shown in the open position. The hand retainer 120 may optionally bias in the open position by a curved resilient member 122 to facilitate the insertion of a hand between the hand retainer 120 and the controller body 110. For example, the curved resilient member 122 may include a flexible metal strip or plastic material, such as nylon, that elastically bends.

A fabric material 124 (e.g., a neoprene sheath) may partially or completely cover the curved resilient member 122 to cushion or increase a comfort of the user. Alternatively, the cushion or fabric material 124 may adhere to only the side of the curved resilient member 122 facing the hand of the user.

The hand retainer 120 may adjust in length, for example, by including a draw cord 126 that is cinched by a spring-biased chock 128. The draw cord 126 may optionally have an excess length for use as a lanyard. In some examples, the cushion or fabric material 124 may attach to the draw cord 126. In addition, the curved resilient member 122 may be preloaded by the tension of the cinched draw cord 126 and in such embodiments, the tension that the curved resilient member 122 imparts to the hand retainer 120 (to bias it in the open position) may cause the hand retainer 120 to automatically open when the draw cord 126 is un-cinched. However, alternative conventional ways to adjust the length of a hand retainer 120, such as a cleat, an elastic band (that temporarily stretches when the hand is inserted to apply elastic tension to press against the back of the hand), a hook & loop strap attachment that allows length adjustment, etc. may be used.

The hand retainer 120 may be disposed between the handle 112 and a tracking member 130, and may contact the back of the hand of the user. The tracking member 130 may affix to the controller body 110 and may optionally include two noses 132, 134, where each nose may protrude from a corresponding one of two opposing distal ends of the tracking member 130. In some instances, the tracking member 130 may include an arc having a substantially arcuate shape. In some instances, the tracking member 130 may include tracking transducers disposed therein, for example, with at least one tracking transducer disposed in each protruding nose 132, 134. The controller body 110 may include additional tracking transducers, such as a tracking transducer disposed adjacent the distal end 111.

The controller 100 may include a rechargeable battery disposed within the controller body 110. The hand retainer 120 may include an electrically-conductive charging wire electrically coupled to the rechargeable battery. The controller 100 may also include a radio frequency (RF) transmitter for communication with the rest of an electronic system (e.g., gaming console). The rechargeable battery may power the RF transmitter and the RF transmitted may respond to the thumb-operated controls 114, 115, 116, the proximity sensor (e.g., the capacitive pads) in the handle 112, and/or tracking sensors in the tracking member 130.

In some instances, the controller body 110 may comprise a single piece of injection molded plastic or any other material rigid enough to transfer a force from a finger of the user to the proximity sensor and thin enough to allow for capacitive coupling between a finger of the user and the proximity sensor. Alternatively, the controller body 110 and the tracking member 130 may be fabricated separately and then later assembled together.

Figure 2:
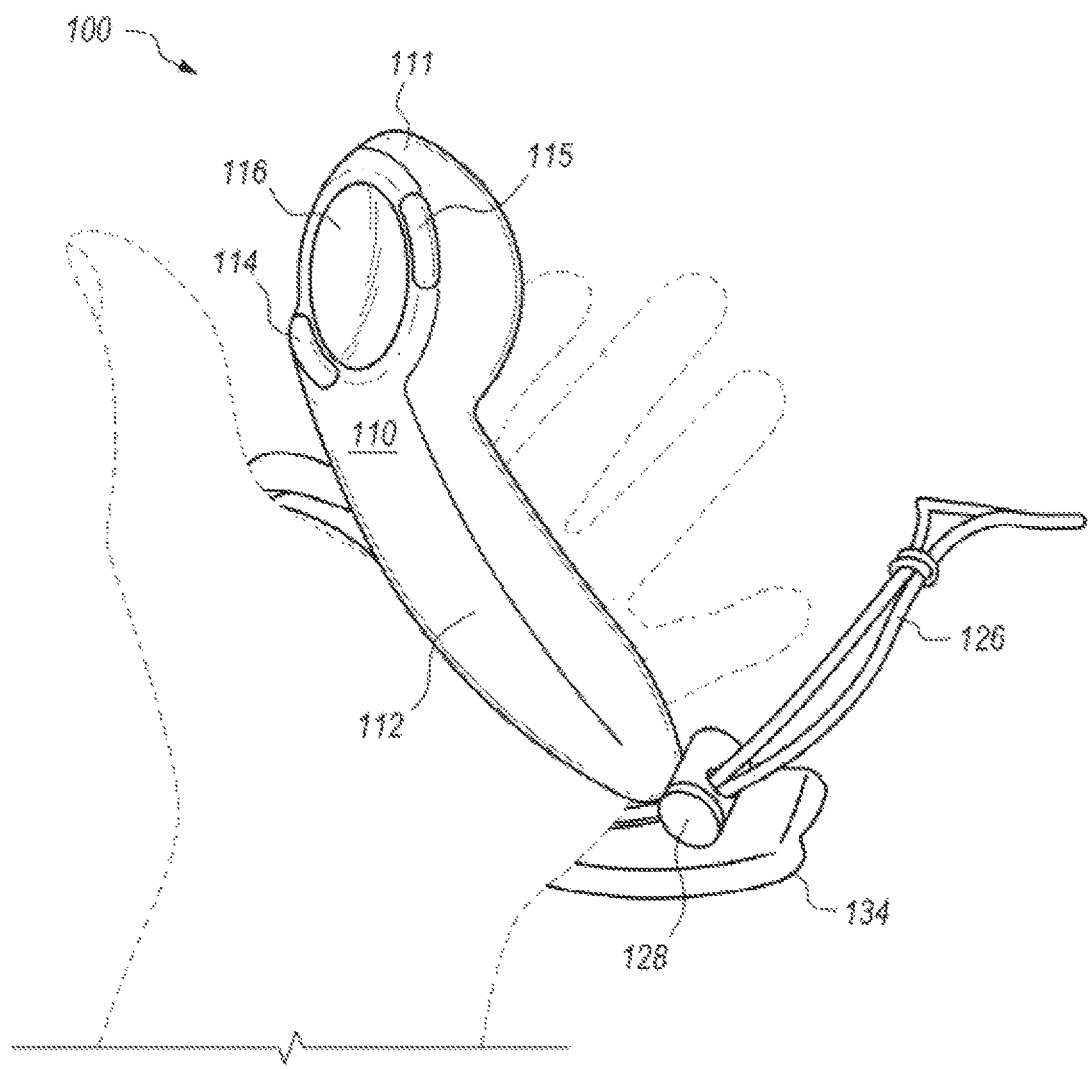
FIG. 2 depicts the controller of FIG. 1 in an open, palm-up, hand of a user according to an example embodiment of the present disclosure.

FIG. 2 illustrates a front view of the controller 100, showing the controller 100 during operation with the left hand of the user inserted therein but not grasping the controller body 110. In FIG. 2, the hand retainer 120 is cinched over the hand of the user to physically bias the palm of the user against the outside surface of the handle 112. Here, the hand retainer 120, when closed, may retain the controller 100 within the hand of the user even when the hand is not grasping the controller body 110. As shown, when the hand retainer 120 is closed tightly around the hand of the user, the hand retainer 120 may prevent the controller 100 from falling out of hand of the user. Hence, in some embodiments, the hand retainer 120 may allow the user to "let go" of the controller 100 without the controller 100 actually separating from the hand, being thrown, and/or dropped. For example, if the release and restoration of the user grasping the handle 112 of the controller body 110 is sensed, the release or grasping may be incorporated into the game to display throwing or grasping objects (e.g., in VR environment). The hand retainer 120 may allow such a function to be accomplished repeatedly and safely. Further, the hand retainer 120 may also prevent fingers of the user from excessively translating relative to the proximity sensor to more reliably sense finger motion, proximity, and/or placement on the handle 112.

Figure 3:
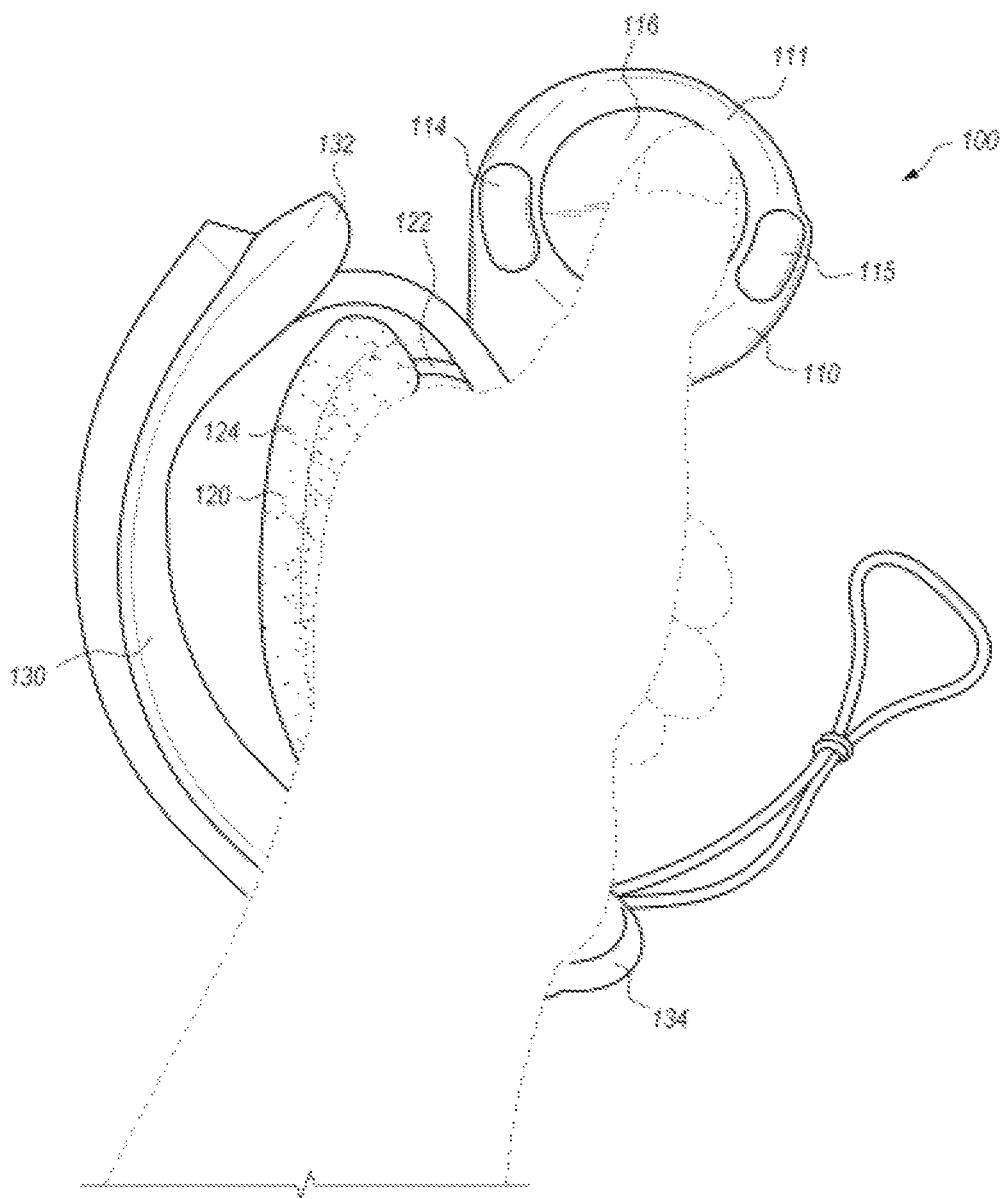
FIG. 3 depicts the controller of FIG. 1 in a closed hand of the user according to an example embodiment of the present disclosure.
Figure 4:
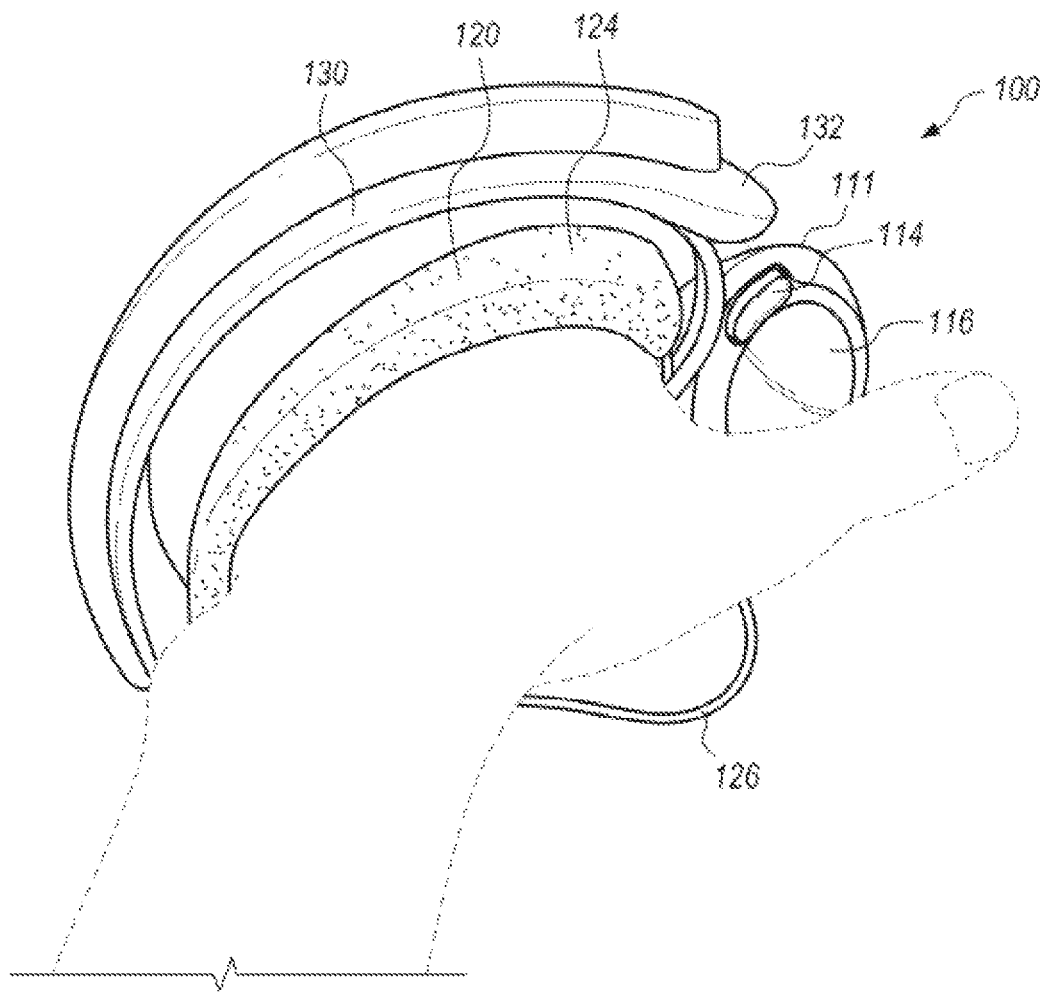
FIG. 4 depicts the controller of FIG. 1 in closed, palm-down, hand of the user according to an example embodiment of the present disclosure.

FIGS. 3 and 4 illustrate the controller 100 during operation when the hand retainer 120 is cinched while the hand of the user grasps the controller body 110 to retain the controller 100 in the hand of the user. As shown in FIGS. 3 and 4, the thumb of the user may operate one or more of the thumb-operated controls 114, 115, 116.

Figure 5:
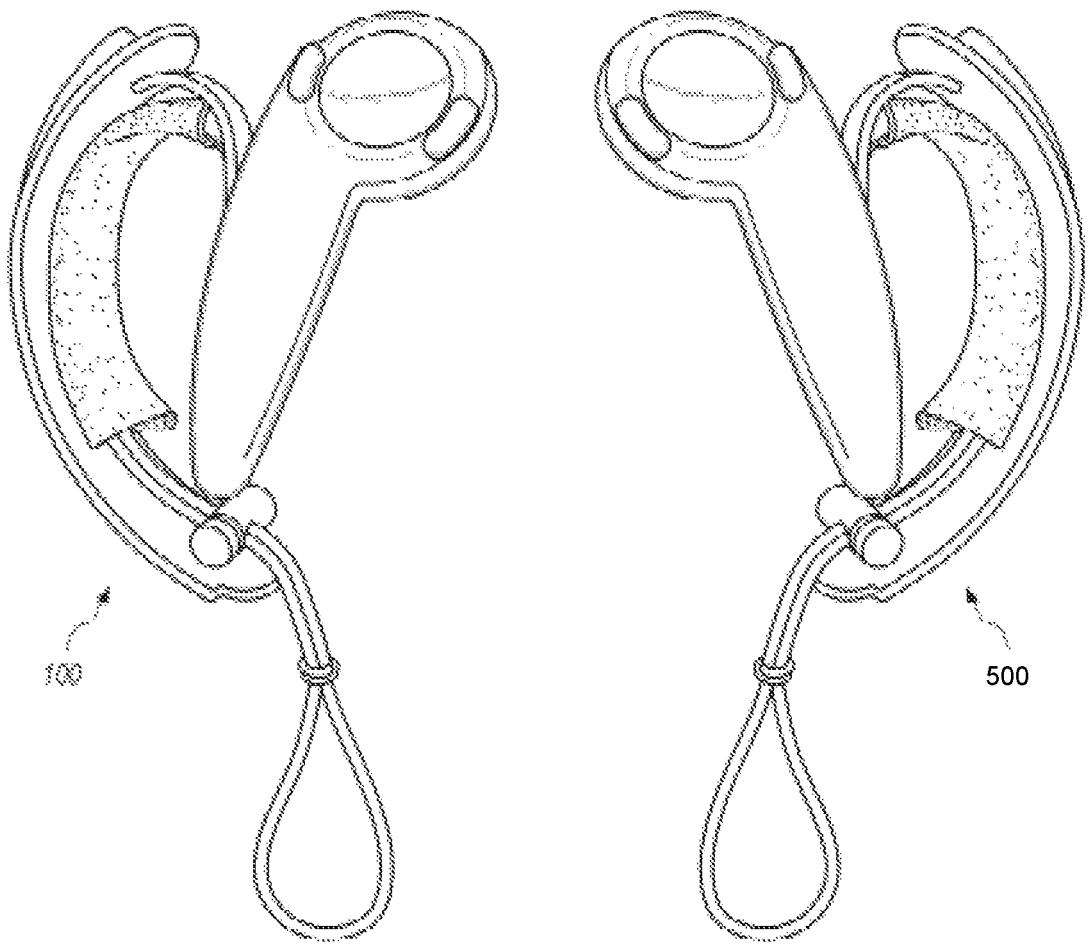
FIG. 5 depicts a pair of controllers, with hand retainers in an open position, according to an example embodiment of the present disclosure.

FIG. 5 illustrates that in certain embodiments, the controller 100 may be a left controller in a pair of controllers that includes a similar right controller 500. In certain embodiments, the controllers 100 and 500 may (together) track the motion and grip of both of the hands of the user, simultaneously, for example, to enhance a VR experience.

Figure 6:
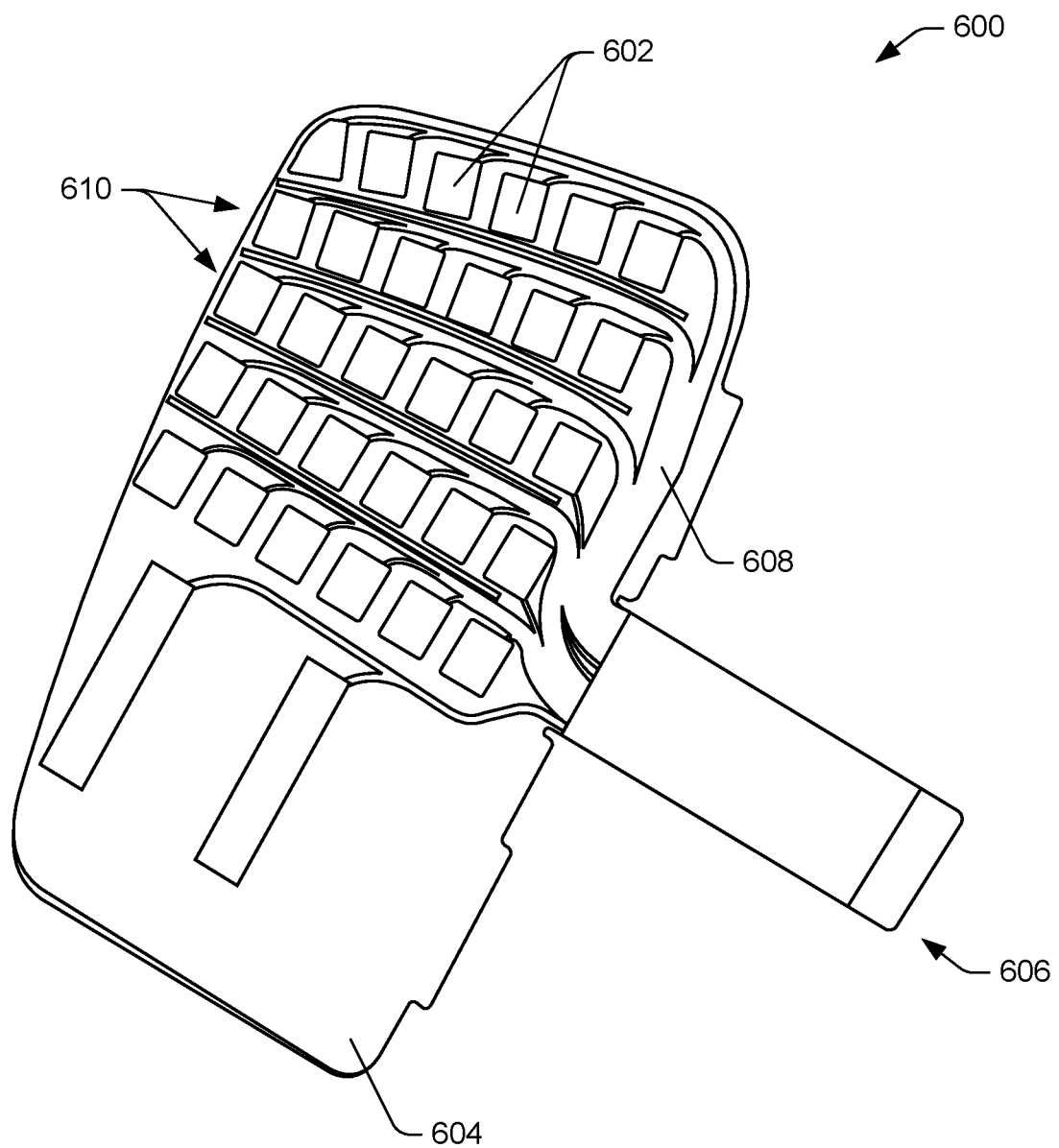
FIG. 6 depicts a proximity sensor of the controller of FIG. 1, according to an example embodiment of the present disclosure.

FIG. 6 illustrates a proximity sensor 600 having a plurality of capacitive pads 602 configured to detect a proximity of one or more objects (e.g., finger) relative to the controller 100. However, in some instances, the proximity sensor 600 may additionally or alternatively include different types of sensors other than the capacitive pads 602 to detect the proximity of the one or more objects relative to the controller 100, such as an infrared or acoustic sensor.

The capacitive pads 602 may mount, attach, or otherwise couple to a flexible printed circuit assembly (FPCA) 604. The FPCA 604 may include a connector 606 for connecting to a printed circuit board (PCB) of the controller 100 that includes one or more processors. The capacitive pads 602 may communicatively connect to the connector 606 via traces 608 disposed on the FPCA 604 to provide proximity data (e.g., capacitance values) to the one or more processors. The proximity data may indicate the proximity of the finger relative to the controller 100, such as the handle 112. Accordingly, the proximity sensor 600 may measure or receive the capacitance of individual capacitive pads 602, where the capacitance value may be associated with a proximity of the finger to the controller 100.

In some instances, the proximity sensor 600 may couple to an interior surface within the controller body 110, such as a structure mounted within the handle 112 of the controller body 110, or a structure mounted underneath the handle 112 of the controller body 110. In doing so, the proximity sensor 600 may be disposed beneath the outer surface of the handle 112 to detect a proximity of the fingers relative to the handle 112. When coupled to the controller 100, the proximity sensor 600 may angularly span around a circumference or a portion of the handle 112. For instance, the FPCA 604 may couple (e.g., adhesive) to the inner surface of the controller body 110. In some embodiments, the proximity sensor 600 may extend at least 100 degrees but not more than 170 degrees around the circumference of the handle 112. Additionally, or alternatively, the proximity sensor 600 may couple to the outer surface of the controller 110, such as an outer surface of the handle 112.

The capacitive pads 602 may be spaced apart from one another to detect a proximity of different fingers, or different portions of the finger(s) (e.g., fingertip). The capacitive pads 602 and may be arranged into rows, columns, a grid, sets, subsets, or groups 610. For instance, as shown in FIG. 6, the proximity sensor 600 may include six groups 610 of capacitive pads 602, where the groups 610 may extend horizontally across the FPCA 604. However, in some embodiments, the proximity sensor 600 may include more than or less than six groups 610. Additionally, as shown in FIG. 6, the capacitive pads 602 are not necessarily of equal size and may not necessarily have substantially equal spacing therebetween. However, in some embodiments, the capacitive pads 602 may be similarly shaped and/or may comprise a grid with substantially equally spacing therebetween.

Individual groups 610 of the capacitive pads 602 may correspond to a particular finger of the user (e.g., index finger, middle finger, ring finger, pinky finger). Additionally, or alternatively, multiple groups 610 of the capacitive pads 602 or capacitive pads 602 from multiple groups 610 may correspond to a single finger of the user. For instance, two or more groups 610 may correspond to a finger of the user (e.g., middle finger). Through arranging the capacitive pads 602 into the groups 610, or assigning certain capacitive pads 602 to certain groups 610, the controller 100 (or another communicatively coupled device) may utilize proximity data to generate hand gestures of the user. For instance, as the user grips the controller 100 with certain fingers and/or hovers certain fingers above the controller 100, a voltage is applied to the capacitive pads 602 that results in an electrostatic field. When a conductor, such as a finger, touches or nears the capacitive pads 602, a change in capacitance may occur. The capacitance may be sensed by connecting an RC oscillator circuit to the proximity sensor 600 (via the connector 606) and noting that a time constant (and therefore the period and frequency of oscillation) will vary with the capacitance. In this way, as a user releases finger(s) from the controller 100, grips the controller 100 with certain finger(s), or nears the controller 100, the controller 100 may detect a change in capacitance. The capacitance values of the capacitive pads 602 are used to determine the location of the conductor as well as the proximity of the conductor relative to the capacitive pad 602. As finger(s) act as a conductor, those capacitive pads 602 underlying the handle 112 may measure a capacitance value.

In some instances, the grip of the user may change or other factors may affect values of the proximity data. For instance, throughout a gameplay experience, the hand of the user may sweat and become damp. Additionally, or alternatively, a humidity of an environment in which a game is being played may change. These, and other factors, may affect an amount of capacitance detected by the capacitive pad(s) 602. To accurately sense finger position, the controller 100 may continuously calibrate the proximity sensor 600 based on the detected capacitance values. For example, at a first instance, a capacitive pad 602 may measure a first capacitance value when a finger is fully extended from the controller 100. As the user plays a game, at a second instance, the capacitive pad 602 may measure a second capacitance value when the finger of the user is fully extended from the controller 100. However, to accurately detect the proximity of the finger relative to the controller 100 (e.g., the handle 112), the controller 100 (or another communicatively coupled device) may calibrate the capacitive pad 602. In such instances, calibrating the capacitive pad(s) 602 (or the proximity sensor 600) may include determining an updated range of capacitance values detected at the individual capacitive pad(s) 602 or decaying capacitance values associated with a touch at the controller 100 and/or the finger being fully extended from the controller 100. Therein, knowing the updated range, the detected capacitance values may be normalized.

In some instances, the capacitive pads 602 may remap to correspond to different fingers. For instance, depending on the grip of the user or the hand size of the user, a particular row or rows of the proximity sensor 600 may correspond to a particular finger of the user (e.g., middle finger), while in other instances, may correspond to a different finger of the user (e.g., ring finger). Through receiving proximity data, the capacitive pads 602 may remap and correspond to different fingers of the user(s). In other words, the capacitive pads 602 may be designated in some instances to correspond to different fingers of the user depending on the grip of a particular user with the handle 112. Accordingly, the controller 100 may include different controller configurations (i.e., a first controller configuration, a second controller configuration, and/or a third controller configuration) to associate different capacitive pads 602 with different fingers. This dynamic adapting of capacitive pads 602 to certain fingers may allow for accurate gestures to be generated in a VR environment. Additionally, while FIG. 6 illustrates the proximity sensor 600 including a certain number of capacitive pads 602 and/or a certain number of groups 610, in some instances, the proximity sensor 600 may include more or less capacitive pads 602 than illustrated in FIG. 6.

Moreover, in some instances, the one or more processors of the controller 100 may include algorithms and/or machine-learning techniques embodying anatomically-possible motions of fingers, to better use the proximity data to detect the opening the hand of the user, finger pointing, or other motions of fingers relative to the controller 100 or relative to each other. In this way, the movement of the controller 100 and/or fingers of the user may help control a VR gaming system, defense system, medical system, industrial robot or machine, or another device. Accordingly, in VR applications (e.g. for gaming, training, etc.), the proximity data may be utilized to render the release of an object based on the sensed release of the fingers of the user from the outer surface of the handle 112. Additionally, or alternatively, one or more processors of a communicatively coupled computing device (e.g., a host computing device, a game console, etc.) that the controller 100 is interacting with may detect the gesture(s) using the proximity data.

FIGS. 7-10 illustrate various processes as a collection of blocks in a logical flow graph, which represent a sequence of operations that can be implemented in hardware, software, or a combination thereof. In the context of software, the blocks represent computer executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
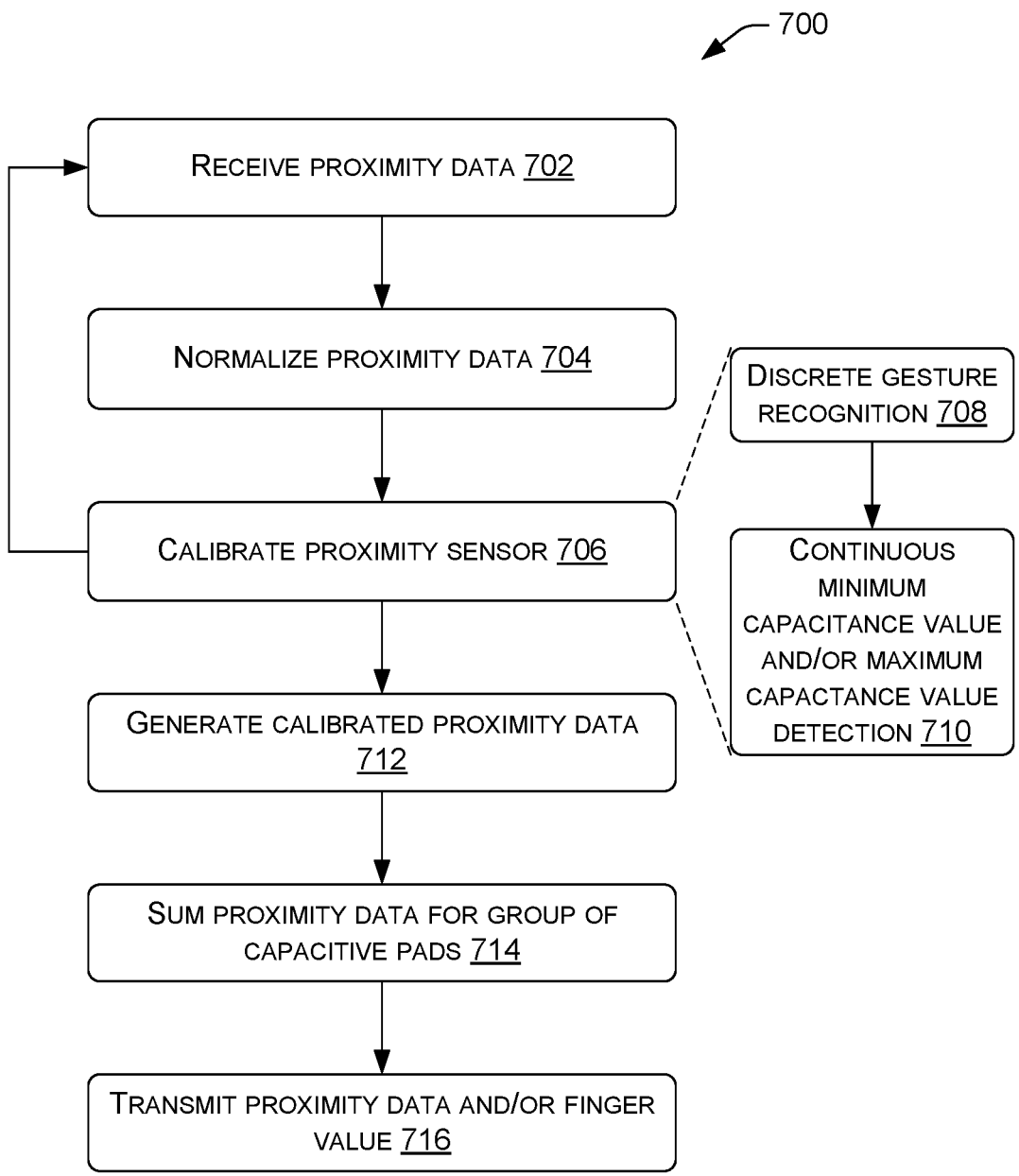
FIG. 7 depicts an example process for configuring the proximity sensor of the controller of FIG. 1 according to an example embodiment of the present disclosure.

FIG. 7 illustrates a process 700 for calibrating a proximity sensor 600. In some instances, the process 700 may be performed by a controller 100.

At 702, logic of the controller 100 may receive proximity data from the proximity sensor 600. For instance, an object (e.g., finger, thumb, etc.) may contact the controller 100 or may come within a proximity of the controller 100 (e.g., hover adjacent to a handle 112 of the controller 100). The proximity data may indicate a capacitance detected or measured by the capacitive pads 602 of the proximity sensor 600. For instance, if a finger is touching the controller 100, the capacitance value may be larger than compared to a finger hovering above the controller 100. In this sense, the detected capacitance value may indicate, or represent, a proximity of the finger relative to the controller 100.

In some instances, logic of the controller 100 may convert the capacitance value into a digitized value. Moreover, the proximity data received at 702 may represent raw data that is not calibrated and/or normalized with proximity data received across capacitive pads 602 of the proximity sensor 600. That is, the proximity data received at 702 may represent raw data in the sense that for a particular capacitive pad 602, the capacitive pad 602 may detect a capacitance value over a range of capacitance values.

At 704, logic of the controller 100 may normalize the proximity data. For instance, individual capacitive pads 602 may generate unique capacitance values depending on manufacturing conditions of the capacitive pad 602, a size of the capacitive pad 602, and so forth. Normalizing the proximity data may assist in standardizing the proximity data received at the capacitive pads 602. In some instances, normalizing the proximity data may include utilizing trained models to determine maximum and minimum capacitance values measured at the capacitive pads 602. For instance, a range of capacitance values detected at a capacitive pad 602 may be arbitrary when compared to a range of capacitance values detected at a different capacitive pad 602. The trained models may include a representative sample of capacitance values, or a range of capacitance values, historically detected across the capacitive pads 602 of the proximity sensor 600. As an example, capacitance values received from like capacitive pads 602 of different controllers (e.g., the controller 100) may be used to normalize the capacitance values.

At 706, logic of the controller 100 may calibrate the proximity sensor 600. In some instances, calibrating the proximity sensor 600 may include calculating a bias, a range of capacitance values, and/or a scale factor for capacitance values detected at the capacitive pads 602. In other words, calibrating the proximity sensor 600 may involve, for individual capacitive pads 602, determining the range of capacitance values detected, a bias, and/or a scale factor. Calibrating the proximity sensor may therefore allow for subsequent capacitance values received to be normalized. As shown by the sub-blocks in FIG. 7, the process 700 may involve more detailed operations to calibrate the proximity sensor 600. For example, calibrating the proximity sensor 600 may include sub-blocks 708 and 710.

As shown by sub-block 708, calibrating the proximity sensor 600 may include a discrete gesture recognition which may represent (or correspond to) a discrete gesture performed by the user. For instance, if all, a portion, or a threshold percentage of the capacitive pads 602 sense a sudden drop in capacitance values, the controller 100 may associate this drop with the user releasing their hand from the controller 100 or releasing a particular finger from the controller 100. That is, as certain capacitive pads 602 may be associated with certain fingers of the user, the controller 100 may detect a decrease in capacitance and associate this decrease in capacitance values with the user releasing their hand from the controller 100.

The capacitance values received as the user suddenly releases their finger from the controller 100 may correspond to a minimum capacitance value within a range of capacitance values detected for a particular capacitive pad 602 (e.g., the capacitance value represents when the finger is fully extended from the controller 100). This minimum capacitance value may therefore, at future instances, be used to determine when the finger is fully extended from the controller 100. In some instances, the capacitance value received prior to this sudden decrease in capacitance values may correspond to a maximum capacitance value of the range of capacitance values detected for the particular capacitive pad 602 (e.g., the capacitance value represents when the finger touches the controller 100). This maximum capacitance value may therefore, at future instances, be used to determine when the finger is touching the controller 100.

Utilizing the minimum capacitance value and the maximum capacitance value, logic of the controller 100 may determine a range of capacitance values detected at the capacitive pad 602. This process may occur for each capacitive pad 602 of the proximity sensor 600. Accordingly, as the controller 100 receives subsequent proximity data, the controller 100 may determine a relative position of the finger of the user through comparing the detected capacitance value with the range of capacitance values for a particular capacitive pad 602.

As shown by sub-block 710, calibrating the proximity sensor 600 may also include a continuous minimum capacitance value and/or maximum capacitance value detection. For instance, as the controller 100 may continuously receive proximity data from the proximity sensor 600, the controller 100 may monitor the proximity data (e.g., the capacitance values) to re-calibrate (e.g., decay) the minimum capacitance value and/or the maximum capacitance value. As will be discussed herein, through iteratively receiving proximity data from the proximity sensor 600 (e.g., as a user interacts with the controller 100), the proximity data may indicate capacitance values measured by the capacitive pads 602. Over time, the capacitance values may be utilized to update and/or modify the range of capacitance values detected by individual capacitive pads 602. As an example, the capacitance values detected by the capacitive pads 602 may change based on skin properties of the user and/or environmental conditions in which the controller 100 resides. Accordingly, at 710, for respective capacitive pads 602 of the proximity sensor 600, the controller 100 may analyze the proximity data to potentially update the minimum capacitance value, the maximum capacitance value, and/or the range of capacitance values for the capacitive pads 602.

For instance, the controller 100, upon receiving capacitance values from the capacitive pads 602, may compare the capacitance values with the maximum capacitance value and/or the minimum capacitance value to determine whether the capacitance value is greater than or less than the maximum capacitance value and/or the minimum capacitance value, respectively. If so, the controller 100 may update the maximum capacitance value and/or the minimum capacitance value, respectively. Moreover, the controller 100 may utilize the capacitance values to decay the maximum capacitance value and/or the minimum capacitance value towards the received capacitance values.

From 706, the process 700 may loop to 702 where the process 700 may receive additional proximity data from the proximity sensor 600. Through iteratively receiving proximity data, the process 700 may continuously determine and/or update the range of capacitance values detected by the capacitive pads 602. Additional details of continuously calibrating the proximity sensor 600 utilizing the proximity data is discussed herein with regard to FIG. 8.

At 712, logic of the controller 100 may generate calibrated proximity data based at least in part on calibrating the proximity sensor 600 and/or the individual capacitive pads 602. For instance, utilizing range of capacitance values detected at the capacitive pads 602, the bias, and/or the scale factor, the controller 100 may calculate a calibrated (or normalized) capacitance value. The calibrated proximity data may normalize the proximity data received at the particular capacitive pad 602 and/or across capacitive pads 602 of the proximity sensor 600.

At 714, logic of the controller 100 may sum the proximity data for a group of capacitive pads 602. As noted above, the capacitive pads 602 may be arranged into groups 610 that are associated with respective fingers of the user. In some instances, as the groups 610 may include more than one capacitive pad 602, the capacitance values for the capacitive pads 602 of a group of capacitive pads 602 may be summed to indicate a finger position of the user, where the summed capacitance value may indicate a proximity of the finger relative to the controller 100. In some instances, the summed capacitance value for a particular group 610 may include a finger value on a scale of [0,1], where the finger value may indicate a proximity of the finger relative to the controller 100. In this sense, using the capacitance values detected from individual capacitive pads 602, the process 700 may determine the finger positions of the user relative to the controller 100.

Moreover, the capacitance values may be summed using a set of weights applied to the individual capacitive pads 602 within a group of capacitive pads 602. For instance, if four capacitive pads 602 are associated with the middle finger of a user, an equal weight may be assigned the four capacitive pads 602. The capacitance values received from these capacitive pads 602 may have a weight of one-quarter that is used when determining a finger position. However, in some instances, certain capacitance values from capacitive pads 602 may be disregarded in the weighted sum if the capacitance value for a capacitive pad 602 is unreliable (e.g., contains a large amount of noise). The weight of the capacitive pad 602 may be ignored such that the remaining capacitive pads have a weight of one-third. Therein, the capacitance values are summed and divided by the sum of the weights of the capacitive pads 602 being used.

At 716, logic of the controller 100 may transmit the proximity data and/or the finger value. For instance, after determining the calibrated proximity data for a particular finger or group of capacitive pads 602, the controller 100 may transmit the proximity data and/or an indication of the finger value (position) to one or more computing devices. In some instances, the one or more computing devices may utilize the proximity data and/or the finger values to generate image data corresponding to a gesture of the hand of the user on the controller 100.

In some instances, the process 700 may be performed for each capacitive pad 602 and each time (e.g., count, frame) the proximity sensor 600 generates proximity data. For instance, as the controller 100 may control or operate a VR environment, the proximity sensor 600 may generate the proximity data for each frame displayed in the VR environment. The proximity data may represent the respective capacitance values detected at the capacitive pads 602 and the process 700 may be performed for the capacitance values measured at individual capacitive pads 602. For instance, the process 700 may be performed for a first capacitance value detected at a first capacitive pad 602 and a second capacitance value detected at a second capacitive pad 602. In some instances, the process 700 for the first capacitive pad 602 and the second capacitive pad 602 may be performed in parallel, and for any number of capacitive pads 602. Additionally, while some or all of the process 700 is described being performed by the controller 100, in some instances, the one or more communicatively coupled devices may perform all of or a portion of the blocks of the process 700. For instance, the computing device(s) may include increased processing power for calibrating the proximity sensor 600. In such instances, the computing device(s) may transmit an instruction to calibrate the proximity sensor 600.

Figure 8:
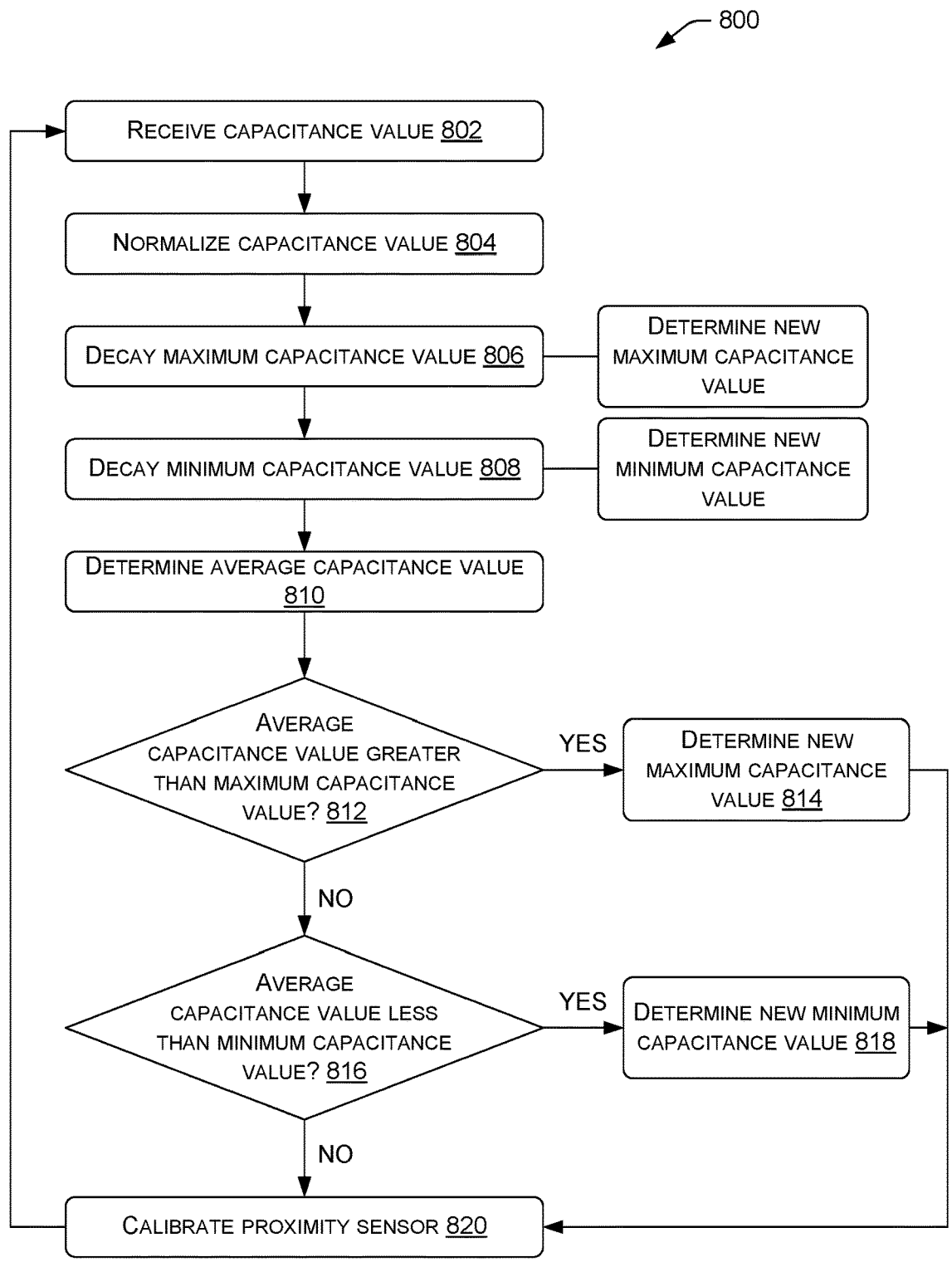
FIG. 8 depicts an example process for configuring the proximity sensor of the controller of FIG. 1 according to an example embodiment of the present disclosure.

FIG. 8 illustrates an example process 800 for analyzing proximity data received from a proximity sensor 600 to calibrate the proximity sensor 600. In some instances, the process 800 may be performed by a controller 100, however, one or more communicatively coupled devices may perform all or a portion of the process 800.

At 802, logic of the controller 100 may receive a capacitance value (e.g., the proximity data) from the proximity sensor 600. In some instances, the controller 100 may receive, from individual capacitive pads 602 of the proximity sensor 600, and at each frame displayed in a VR environment, the capacitance value. For instance, based at least in part on detecting an object in proximity to the controller 100 (e.g., finger), a capacitive pad 602 of the proximity sensor 600 may generate the capacitance value. As indicated above, as the distance between the object and the capacitive pad 602 decreases, the measured capacitance value may increase.

At 804, logic of the controller 100 may normalize the capacitance value using a range of capacitance values for the capacitive pad 602, a scale factor associated with the capacitive pad 602, and a bias associated with the capacitive pad 602.

At 806, the controller 100 may decay a limit, or level, associated with a maximum capacitance value to gradually assign or adjust the maximum capacitance value. Decaying the maximum capacitance value may adjust to varying environment conditions and/or characteristics of the finger(s) of the user. For instance, over the course of a gameplay experience, the hands of a user may become damp (e.g., sweaty), the user may adjust his or her grip on the controller 100, and/or conditions of an environment may change (e.g., humidity, temperature, etc.). In some instances, these factors may affect the capacitance values detected by the proximity sensor 600 and the range of the capacitance values may be updated and/or the capacitance value associated with a finger touching the controller 100 may be updated. In other words, because the range of capacitance values detected by the controller 100 may change, a capacitance value associated with the finger touching the controller 100 may change. As such, to accurately portray a finger position (or hand gesture) of the user (i.e., when the finger is touching the controller 100), the maximum capacitance value may decay. To illustrate, at a first instance in time, a first capacitance value may represent or correspond to a finger touching the controller 100 and at a second instance in time, a second capacitance value may represent or correspond to the finger touching the controller 100. In some instances, the second capacitance value may be less than the first capacitance value. However, to accurately portray the hand gesture of the user at the second instance, the capacitance value associated with the finger touching the controller 100 may update. That is, although the second capacitance value represents the user touching the controller 100, if the maximum capacitance value were to not decay, the second capacitance value would not be associated with the maximum capacitance value representing when the finger is touching the controller 100. In doing so, the image data would not depict the user holding an object. Through decaying the maximum capacitance value, the controller 100 may dynamically adjust the capacitance value associated with the finger grasping the controller 100.

In some instances, decaying the maximum capacitance value may be based at least in part on receiving a threshold number of capacitance values that are not within a predetermined range of the maximum capacitance value. Additionally, or alternatively, decaying the maximum capacitance value may occur if a threshold amount of time, number of frames, or number of counts pass without receiving capacitance values within the predetermined range of the maximum capacitance value and/or the capacitance values changing (e.g., variability) by a threshold amount. In other instances, if an average of the capacitance values detected over a previous amount of time, number of frame, or number of counts, is not within the predetermined range of the maximum capacitance value, the maximum capacitance value may decay. Additionally, although decaying the maximum capacitance value has been described with respect to the capacitance value not being within the predetermined range of the maximum capacitance value, in some instances, the predetermined range may be with respect to the minimum capacitance value.

Accordingly, the maximum capacitance value may continuously decay such that the range of capacitance values continuously updates. The amount of the decay, or an amount the maximum capacitance value decays, may be based on the range of capacitance values detected over a previous number of frames (e.g., 20 frames, 50 frames, 100 frames, and so forth), a range of capacitance values between the maximum capacitance value and the minimum capacitance value, a difference between the maximum capacitance value and the average capacitance value detected over a previous number of counts or frames (e.g., 20 frames, 50 frames, 100 frames, and so forth), and/or a percentage of the difference between the maximum capacitance value and the average capacitance value. In some instances, the decay may be determined by calculating (1) the range of capacitance values detected over the previous number of frames, (2) the range of capacitance values between the maximum capacitance value the minimum capacitance value, and (3) a decay variable.

The decay variable for the maximum capacitance value may be a percentage of the variability of the capacitance values between the maximum capacitance value the minimum capacitance value, as detected over a previous number of frames. As an example, the decay variable for the maximum capacitance value may be ten percent of the range of capacitance values between the maximum capacitance value the minimum capacitance value for each frame. In other words, for every frame, the decay variable may be calculated by multiplying the range of capacitance values between the maximum capacitance value the minimum capacitance value by ten percent. This decay variable may then be used to determine the updated maximum capacitance value. In some instances, the maximum capacitance value may decay approximately, or substantially, about thirteen percent of the range between the maximum capacitance value and the minimum capacitance value.

In some instances, the amount the maximum capacitance value decays may be limited such that the maximum capacitance value does not decay more than fifty percent of the range of capacitance values between the maximum capacitance value the minimum capacitance value. In this sense, the maximum capacitance value may be limited to decaying to more than half of the range of capacitance values between the maximum capacitance value the minimum capacitance value.

In some instances, the amount the maximum capacitance value decays may be proportional to the range of capacitance values between the maximum capacitance value the minimum capacitance value. Moreover, the maximum capacitance value may be limited to decaying to within a certain threshold of the minimum capacitance value. For instance, to reduce an impact of noise within the capacitance values, the maximum capacitance value may not decay to within a threshold amount of the minimum capacitance value. In other words, the maximum capacitance value and the minimum capacitance value may be separated by a threshold range to reduce the impact of noise.

In some instances, a rate at which the maximum capacitance value decays may depend on a variability of the measured capacitance values. For instance, if a large variability exists between the capacitance values detected over a past number of frames, the maximum capacitance value may decay at a faster rate, as compared to if a small variability exists between the capacitance values detected over the past number of frames. Additionally, or alternatively, the rate at which the maximum capacitance value decays may depend on a number of capacitance values received. For instance, if the user is rapidly tapping his or her fingers on the controller 100 and the controller 100 receives a large number of capacitance values, the controller 100 may decay the maximum capacitance value at a faster rate.

Decaying the maximum capacitance value may be used to determine an updated maximum capacitance value for the capacitive pads 602. Additionally, the updated maximum capacitance value may also be used to determine an updated range of capacitance values, an updated bias, and/or an updated scale factor for individual capacitive pads 602 of the proximity sensor 600.

At 808, logic of the controller 100 may decay a limit, or level, associated with the minimum capacitance value to gradually assign or adjust the minimum capacitance value. In some instances, the minimum capacitance value may continuously decay such that the range of capacitance values continuously updates. That is, as discussed above with regard to decaying the maximum capacitance value, over the course of a gameplay experience, certain conditions may affect the capacitance values detected at the proximity sensor 600. For instance, the capacitance value associated with the finger being fully extended from the controller 100 may change. As an example, at a first instance in time, a first capacitance value may represent or correspond to a finger being fully extended from the controller 100 and at a second instance in time, a second capacitance value may represent or correspond to the finger being fully extended from the controller 100. In some instances, the second capacitance value may be less than the first capacitance value. However, to accurately portray the hand gesture of the user at the second instance, the capacitance value associated with the finger being fully extended from the controller 100 may update. That is, although the second capacitance value may represent the user fully extending their finger from the controller 100, the second capacitance value may not be associated with the minimum capacitance value representing the finger being fully extended. Through decaying the minimum capacitance value, the controller 100 may dynamically adjust the capacitance value associated with the finger being fully extended.

Decaying the minimum capacitance value may be based at least in part on receiving a threshold amount of capacitance values not within predetermined range of the minimum capacitance value. Additionally, or alternatively, decaying the minimum capacitance value may be based at least in part on a threshold amount of time, number of frames, or number of counts passing since receiving capacitance values within the predetermined range of the minimum capacitance value, and/or the capacitance values over a predetermined past number of capacitance values changing by a threshold amount.

The amount of the decay, or an amount the minimum capacitance value decays, may be based on the range of capacitance values detected over a previous number of frames (e.g., 20 frames, 50 frames, 100 frames, and so forth), a range of capacitance values between the minimum capacitance value and the maximum capacitance value, a difference between the minimum capacitance value and the average capacitance value detected over a predetermined number of past frames, and/or a percentage of the difference between the minimum capacitance value and the average capacitance value. In other instances, if an average of the capacitance values detected over a previous number of frames, is not within the predetermined range of the minimum capacitance value, the minimum capacitance value may decay. In some instances, the decay may be determined by calculating (1) the range of capacitance values detected over the previous number of counts or frames, (2) the range of capacitance values between the minimum capacitance value the maximum capacitance value, and (3) a decay variable.

In some instances, the decay variable for the minimum capacitance value may be a percentage of the variability of the capacitance values between the minimum capacitance value the maximum capacitance value as detected over a previous number of frames. For instance, the decay variable for the minimum capacitance value may be twenty percent of the range of capacitance values between the minimum capacitance value and the maximum capacitance value for each frame. In other words, for every frame, the decay variable may be calculated by multiplying the range of capacitance values between the minimum capacitance value the maximum capacitance value by twenty percent.

In some instances, the minimum capacitance value may be permitted to decay twice as fast as the maximum capacitance value. That is, because the minimum capacitance value, or capacitance values within a lower-range of the capacitance values may be susceptible to noise, the minimum capacitance value may decay twice as fast as the maximum capacitance value. However, in some instances, the amount the minimum capacitance value decays may be limited such that the minimum capacitance value does not decay more than fifty percent of the range of capacitance values between the maximum capacitance value the minimum capacitance value. In this sense, the minimum capacitance value may be limited to decaying more than half of the range of capacitance values between the maximum capacitance value the minimum capacitance value. Accordingly, the amount the minimum capacitance value decays may be proportional to the range of capacitance values between the maximum capacitance value the minimum capacitance value. Moreover, the minimum capacitance value may be limited to decaying to within a certain threshold of the maximum capacitance value to reduce noise.

Decaying the minimum capacitance value may be used to determine an updated minimum capacitance value for the capacitive pads 602. Additionally, in combination with decaying the maximum capacitance value, the updated minimum capacitance value may also be used to determine an updated range of capacitance values, an updated bias, and/or an updated scale factor for individual capacitive pads 602 of the proximity sensor 600.

In some instances, a rate at which the minimum capacitance value decays may depend on a variability of the measured capacitance values. For instance, if a large variability exists between the capacitance values detected over a past number of frames, the minimum capacitance value may decay at a faster rate, as compared to if a small variability exists between the capacitance values detected over the past number of frames.

At 810, the controller 100 may determine an average capacitance value detected by the capacitive pads 602 over a previous number of counts or frames. For instance, the controller 100 may determine an average capacitance value detected by individual capacitive pads 602 over the previous twenty samples. However, as noted above, decaying the maximum capacitance value and/or the minimum capacitance value may be based on the average capacitance value determined the previous number of frames. Hence, the average capacitance value may be known.

At 812, logic of the controller 100 may determine whether the average capacitance value determined at 810 is greater than the updated maximum capacitance value determined at 806. That is, based at least in part on determining the average capacitance value, the controller 100 may compare the average capacitance value with the maximum capacitance value to determine whether the average capacitance value is greater than the maximum capacitance value detected at the capacitive pad 602. In other words, each capacitive pad 602 may be associated with a maximum capacitance value and the controller 100 may determine whether the average capacitance value is greater than the maximum capacitance value. Upon determining that the average capacitance value exceeds the maximum capacitance value, the process 800 may follow the "YES" route to 814 where logic of the controller 100 may determine a new maximum capacitance value. In other words, as a result of "YES" at 812, logic of the controller 100 may determine that the maximum capacitance value is too low and that the average capacitance value has exceeded the maximum capacitance value.

At 814, logic of the controller 100 may determine a new maximum capacitance value for the capacitive pad 602 based at least in part on a percentage, or weight, of the average capacitance values received over a predetermined number of frames. For instance, the new maximum capacitance value, instead of decaying, may extend towards the average capacitance value determined from a previous number of past samples. In some instances, the amount the maximum capacitance value "grows" may be determined by multiplying the average capacitance values from the previous number of frames by a variable, such as 0.2. However, the variable may be optimized such that the maximum capacitance value "grows" towards the average capacitance value determined over the previous number of frames to accurately determine the hand gesture of the user. In some instances, the amount of growth of the maximum capacitance value may also be based at least in part on an amount of the average capacitance value exceeds the maximum capacitance value.

Alternatively, if the average capacitance value is not greater than the maximum capacitance value detected at the capacitive pad 602, the process 800 may follow the "NO" route to 816, where logic of the controller 100 may determine whether the average capacitance value is lower than the minimum capacitance value determined at 808. That is, based at least in part on determining the average capacitance value, the controller 100 may compare the average capacitance value with the minimum capacitance value to determine whether the average capacitance value is less than the minimum capacitance value detected at the capacitive pad 602. In other words, each capacitive pad 602 may be associated with a minimum capacitance value and the logic of the controller 100 may determine whether the average capacitance value is less than the minimum capacitance value. Upon determining that the average capacitance value is less than the minimum capacitance value, the process 800 may follow the "YES" route to 818 where logic of the controller 100 may determine a new minimum capacitance value. In other words, as a result of "YES" at 816, the logic of the controller 100 may determine that the minimum capacitance value is too high and that the average capacitance value has exceeded the minimum capacitance value.

At 818, the controller 100 may determine a new minimum capacitance value for the capacitive pad 602 based at least in part on a percentage, or weight, of the average capacitance values over a previous number of frames. For instance, the new minimum capacitance value, instead of decaying, may extend towards the average capacitance value of the previous number of frames. In some instances, the amount the minimum capacitance value "grows" may be determined by multiplying the average capacitance value of a predetermined number of previous capacitance values by a variable, such as 0.4. However, the variable may be optimized such that the minimum capacitance value "grows" towards the average capacitance value determined over the previous number of frames to accurately determine the hand gesture of the user. In some instances, the amount of growth of the minimum capacitance value may also be based at least in part on an amount the average capacitance value exceeds the minimum capacitance value.

If, at 816, the average capacitance value is not less than the minimum capacitance value, the process 800 may follow the "NO" route to 820 where the controller 100 may calibrate the proximity sensor 600.

Calibrating the proximity sensor 600 (or the capacitive pads 602) may also follow from determining the new maximum capacitance value (e.g., 814) and/or determining the new minimum capacitance value (e.g., 818). As noted above, calibrating the proximity sensor 600 may involve calculating the bias and scale factor for the capacitive pads 602. In other words, calibrating the proximity sensor 600 may involve, for each capacitive pad 602, determining the range of capacitance values detected, a bias, and/or a scale factor. Accordingly, to calibrate the proximity sensor 600, the controller 100 may utilize the new maximum capacitance value and/or the minimum capacitance value.

From 820, the process 800 may loop to 802 where the controller 100 may receive subsequent capacitance values. That is, through iteratively receiving capacitance values, the process 800 may continuously decay the maximum capacitance value, the minimum capacitance value, determine and/or update the range of capacitance values detected by the capacitive pads 602, and/or to normalize the capacitance values.

Figure 9:
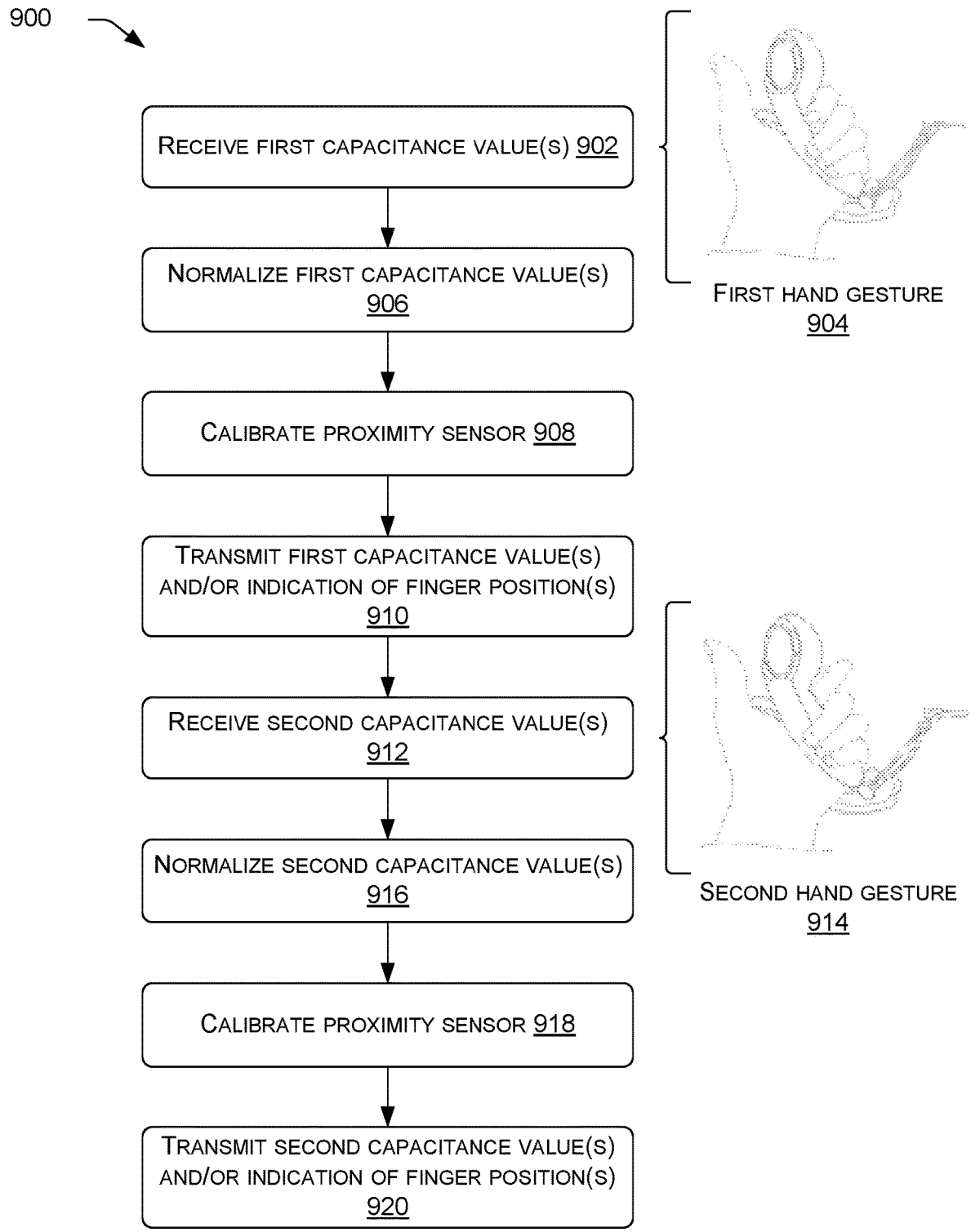
FIG. 9 depicts an example process for configuring the proximity sensor of the controller of FIG. 1 according to an example embodiment of the present disclosure.

FIG. 9 illustrates a process 900 for receiving capacitance values associated with a hand gesture at a controller 100, calibrating a proximity sensor 600, and transmitting the capacitance values and/or an indication of a proximity of a finger relative to the controller 100.

At 902, the process 900 may receive first capacitance values. For instance, one or more processors of the controller 100 may receive the first capacitance values from the proximity sensor 600. The first capacitance values may represent the capacitance values detected by individual capacitive pads 602 of the proximity sensor 600, where the first capacitance values represent a proximity of individual fingers of the user relative to the controller 100. For instance, the first capacitance values may correspond to a first hand gesture 904 and the first capacitance values may indicate a proximity of the finger(s) of the user relative to the capacitive pads 602.

At 906, the process 900 may normalize the first capacitance values. For instance, the one or more processors of the controller 100 may normalize the first capacitance values received from the individual capacitive pads 602 utilizing operations of the process(es) 700 and/or 800 discussed and explained hereinabove.

At 908, the process 900 may calibrate the proximity sensor 600 based at least in part on the first capacitance values. For instance, the one or more processors of the controller 100 may calibrate the proximity sensor 600 through determining a range of capacitance values detected at the capacitive pads 602, a bias associated with the capacitive pads 602, and/or a scale factor associated with the capacitive pads 602, as discussed above with regard to the process(es) 700 and/or 800 discussed and explained hereinabove.

At 910, the process 900 may transmit the first capacitance values and/or an indication of the finger position(s). For instance, the one or more processors of the controller 100 may utilize one or more interfaces of the controller 100 to transmit the first capacitance values and/or the indication of the finger position(s) to a computing device. In some instances, the computing device may utilize the first capacitance values and/or the indication of the finger position(s) to generate image data depicting the first hand gesture 904. The indication of the finger position(s) may indicate a numerical value on a scale of [0,1] corresponding to the relative position of the finger(s) to the controller 100. A value of one on the [0,1] scale may indicate that a finger touches the controller 100 whereas a value of zero on the [0,1] scale may indicate that the finger is fully extended from the controller 100. Turning to the first hand gesture 904, after receiving the first capacitance values, normalizing the first capacitance values, and/or calibrating the proximity sensor 600, the controller 100 may transmit an indication including a finger value on a scale of [0,1] that correspond to a position of the finger relative to the controller 100. The finger values may therein be used to generate image data corresponding to the first hand gesture 904.

At 912, the process 900 may receive second capacitance values. For instance, the one or more processors of the controller 100 may receive the second capacitance values from the proximity sensor 600. The second capacitance values may represent the capacitance values detected by individual capacitive pads 602 of the proximity sensor 600, where the second capacitance values represent a proximity of individual fingers of the user relative to the controller 100. For instance, the second capacitance values may correspond to a second hand gesture 914 and the second capacitance values may indicate a proximity of the finger(s) relative to the capacitive pads 602.

At 916, the process 900 may normalize the second capacitance values and at 918 the process 900 may calibrate the proximity sensor 600 (e.g., determining a range, a bias, and/or a scale factor associated with the capacitive pads 602).

At 920, the process 900 may transmit the second capacitance values and/or an indication of the finger position(s). For instance, the one or more processors of the controller 100 may utilize one or more interfaces of the controller 100 to transmit the second capacitance values and/or the indication of the finger position(s) to a computing device. In some instances, the computing device may utilize the second capacitance values and/or the indication of the finger position(s) to generate image data depicting the second hand gesture 914. For instance, the indication of the finger position(s) may indicate a numerical value on a scale of [0,1] the relative position of the finger(s) relative to the controller 100.

Figure 10:
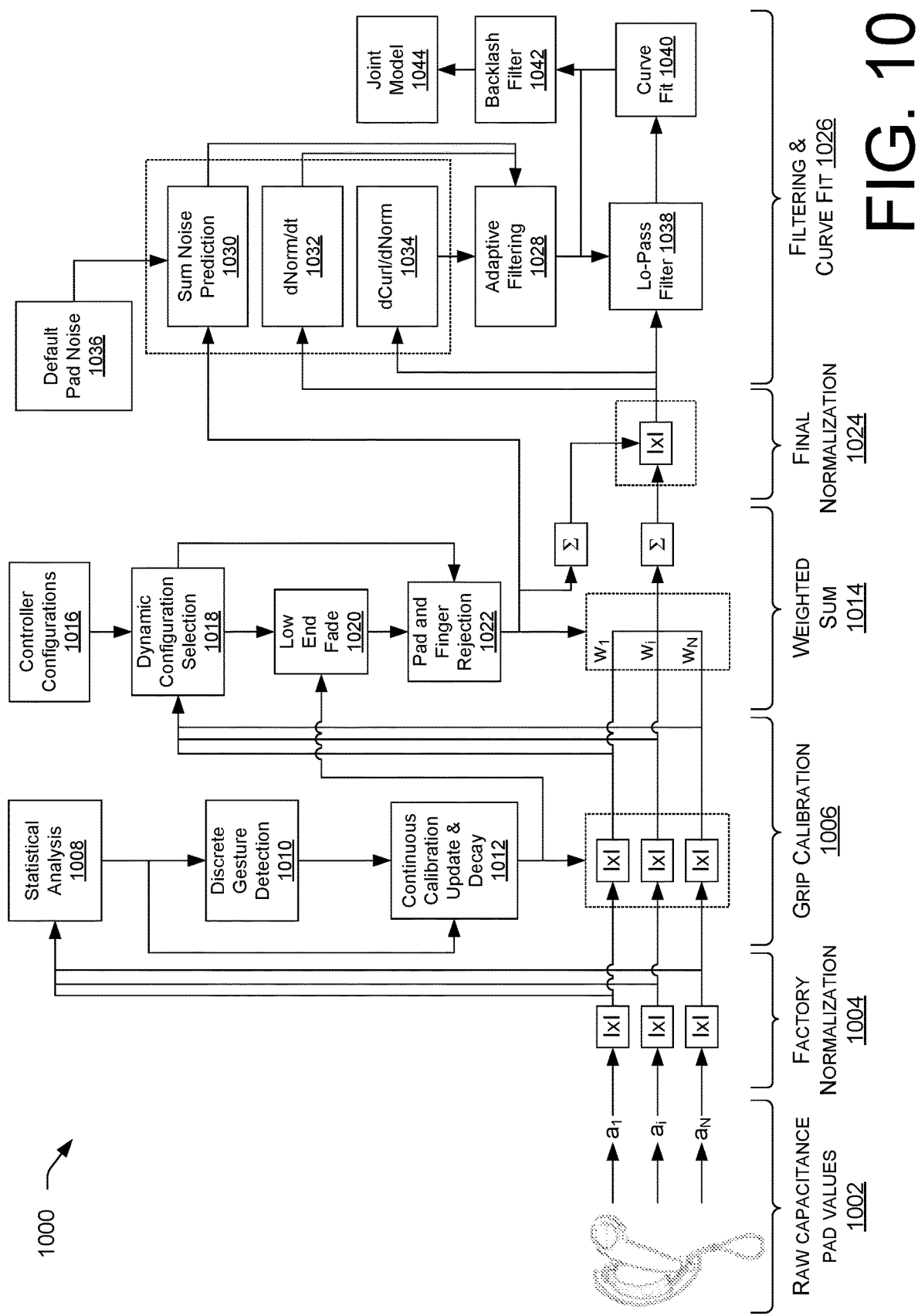
FIG. 10 depicts an example process for configuring the proximity sensor of the controller of FIG. 1 according to an example embodiment of the present disclosure.

FIG. 10 illustrates a process 1000 for calibrating a proximity sensor 600 of a controller 100, reducing noise within proximity data, and utilizing the proximity data to generate image data representative of hand gestures performed by the user.

At 1002, the process 1000 may receive proximity data from the proximity sensor 600, where the proximity data represents or indicates raw capacitance values detected by capacitive pads 602 of the proximity sensor 600. As illustrated in FIG. 10, in some instances, the process 1000 may receive capacitance values from individual capacitive pads 602, as illustrated by $a_1$, $a_i$, and $a_N$. In some instances, the process 1000 may receive the raw capacitance values from the proximity sensor 600 for each frame displayed in a VR environment.

At 1004, the process 1000 may perform a factory normalization to normalize the raw capacitance values. For instance, the capacitive pads 602 may have different biases, scale factors, and offsets depending on manufacturing conditions, a size of the capacitive pad 602, and so forth. In some instances, the factory normalization may involve a first order calibration to remove the bias within the capacitance value and normalizing the capacitance value.

At 1006, the process 1000 may perform a grip calibration. As shown, the grip calibration may involve sub-blocks 1008, 1010, and 1012, which are discussed in detail in turn.

At sub-block 1008, the process 1000 may perform a statistical analysis to observe a range of capacitance values, the maximum capacitance value received, the minimum capacitance value received, the average capacitance value, and/or the median capacitance value for respective capacitive pads 602.

At 1010, the process 1000 may perform a discrete gesture detection. Here, the process 1000 may analyze the proximity data (i.e., the capacitance values), after being normalized according to the factory normalization, to detect a discrete gesture at the controller 100. For instance, if the proximity data indicates that capacitance values of the capacitive pads 602, or a portion thereof, suddenly drop, the process 1000 may associate this drop of capacitance values with the user releasing his or her hand from the controller 100 or releasing a particular finger from the controller 100. The capacitance values received as the user suddenly releases his or her finger from the controller 100 may correspond to a minimum capacitance value for a range of capacitance values detected by a particular capacitive pad 602 (e.g., when the finger is not touching the controller 100). The capacitance value received prior to the sudden drop may correspond to a maximum capacitance value of the range of capacitance values detected by a particular capacitive pad 602 (e.g., where the capacitance value represents when the finger is touching the controller 100). With the range of capacitance values, the process 1000 may determine a bias and a scale factor for capacitance values of the capacitive pads 602 to normalize the capacitance values received at respective capacitive pads 602 of the proximity sensor 600.

At 1012, the process 1000 may perform a continuous calibration update and decay. As the process 1000 may continuously receive proximity data from the proximity sensor 600, the process 1000 may continuously monitor the proximity data to re-calibrate or reset the minimum capacitance value and/or the maximum capacitance value for the range of capacitance values for a given capacitive pad 602. In other words, through continuously receiving the proximity data from the individual capacitive pads 602, the process 1000 may determine whether the capacitance values are lower than or higher than the previously determined minimum capacitance value of the range and/or the maximum capacitance value of the range, respectively.

For instance, as the capacitance may change throughout a gameplay experience (e.g., hands become sweaty or dry, humidity, temperature, etc.), the process 1000 may determine, or set, a new minimum capacitance value or a new maximum capacitance value, thereby adjusting the range of capacitance values detected by a capacitive pad 602. Additionally, in some instances, the continuous calibration may reduce a dependence on the process 1000 determining the discrete gesture detection at 1010.

In some instances, the process 1000 may assign a weight or percentage to a newly detected minimum capacitance value or a newly detected maximum capacitance value to update the minimum capacitance value or maximum capacitance value, respectively. For instance, if the process 1000 detects a capacitance value below a previously detected minimum capacitance value for a certain amount of time, or a certain number of frames, the process 1000 may weigh the capacitance value to update the minimum capacitance value. Additionally, the minimum capacitance value and/or the maximum capacitance value may decay over time depending on how the user grips the controller 100, environmental conditions (e.g., humidity), or other properties (e.g., skin wetness). The amount the minimum capacitance value and the maximum capacitance value may decay may be limited, such that the minimum capacitance value and the maximum capacitance value are separated by a threshold amount to reduce sensor noise. In some instances, the decay may depend on time and/or a rate of change in the capacitance values detected by the proximity sensor 600. For instance, if the user taps their fingers on the controller 100 such that the controller 100 detects a threshold amount of capacitance values within a certain period of time, or frames, or the controller 100 switches users, thereby potentially causing a large change (or variability) in the capacitance values received, the rate of decay may increase to reduce an amount of time required to update the minimum capacitance value and/or the maximum capacitance value.

As a result of the grip calibration at 1006, and the sub-blocks 1008-1012, the capacitance values sensed from each capacitive pad 602 may be normalized on a scale of [0,1]. The scale of [0,1] may represent, for a particular grip of a user and for the individual capacitive pads 602, the high and low levels for the capacitance values sensed from the proximity sensor 600.

At 1014, the process 1000 may perform a weighted sum of the capacitance values. As the capacitance values are normalized on the scale of [0,1], the process 1010 may assign a weight to capacitance values from the capacitive pads 602 depending on the controller configuration. That is, the capacitance values are normalized between [0,1] and weights are assigned to individual capacitance values received the individual capacitive pads 602. For instance, if a certain controller configuration includes five capacitive pads 602 assigned to a particular finger, the capacitance values may include an equal weight (e.g., one-fifth). In other words, when the capacitive pads 602 detect a maximum capacitance value, the output of the weighted sum may equal one.

As shown, determining the weighted sum may involve sub-blocks 1016, 1018, 1020, and 1022. Sub-block 1016 may include the controller configuration models for the controller 100. Noted above, the controller configurations designate a mapping of capacitive pads 602 of the proximity sensor 600 to associate certain capacitive pads 602 with certain fingers of the user.

At sub-block 1018, the process 1000 may perform a dynamic controller configuration selection, where the process 1000 inputs the capacitance values into the controller configuration model(s) to determine a best match, or highest matched, controller configuration according to the grip of the user. Selecting the controller configuration may involve determining a ratio of (1) the variance of capacitance values for a group of capacitive pads 602 assigned to a particular finger and (2) the variance of capacitance values between groups of capacitive pads 602. A ratio is calculated for each controller configuration to determine a most likely match for the grip of the user.

At sub-block 1020, the process 1000 may filter noise contained within the capacitance values. For instance, when a finger is not touching the controller 100, such as when a finger is fully extended, those capacitive pads 602 associated with the finger not touching the controller 100 (e.g., finger is fully extended) may be susceptible to noise. Here, detecting a small amount of capacitance may cause a large amount of noise within the received capacitance value. In instances where the capacitance values from the proximity sensor 600 for individual capacitive pads 602 fall below a certain threshold, or if the capacitance values are within a certain limit of the low-level capacitance value for the capacitive pads 602, the process 1000 may suppress a detected capacitance. In other instances, in such scenarios, the process 1000 may assign a low weight to the capacitance values.

At sub-block 1022, the process 1000 may reject certain capacitance values from capacitive pads 602 of the proximity sensor 600 and/or fingers associated with respective capacitive pads 602. For instance, at 1020 the process 1000 may identify capacitive pads 602 that have a small range between the minimum capacitance value or maximum capacitance value. In these scenarios, capacitance values received by the capacitive pads 602 may introduce noise and disregarding certain capacitive pads 602, or groups of capacitive pads 602, may increase a reliability that the proximity data corresponds to the hand gesture of the user. That is, if the range of capacitance values detected by a capacitive pad 602 is small, the capacitive pad 602 may be susceptible to large amounts of noise.

The capacitive pad and finger rejection, at sub-block 816, may include identifying capacitive pads 602 whose minimum capacitance value or maximum capacitance value are within a threshold range of one another. For instance, if the minimum capacitance value and the maximum capacitance value are separated by a small range, the capacitive pad 602 may be unable to accurately sense and detect the finger positions of the user in sufficient detail. Here, as a capacitive pad 602 may detect capacitance values within a threshold range, the measured capacitance values may not accurately correspond to the finger position. Additionally, or alternatively, certain fingers may be associated with a number of capacitive pads 602 that decreases the reliability of the detected capacitance values. In these scenarios, capacitance values received by the capacitive pads 602 may introduce noise and disregarding certain capacitive pads 602, or groups of capacitive pads 602, may increase a reliability that the capacitance values correspond to the hand gesture of the user. Additionally, or alternatively, certain fingers may be associated with a number of capacitive pads 602 having a low reliability. Rejecting certain fingers, or a group of capacitive pads 602, introduces a contingency behavior for controller configurations for small hand. In these scenarios, a respective finger may associate with adjacent fingers (e.g., pinky finger associates with ring finger).

At 1024, the process 1000 may perform a final normalization. For example, in some instances, a capacitive pad 602 assigned to a particular finger may not detect a capacitance value or the capacitance values may be unreliable. Here, the user may not touch certain capacitive pads 602 of the proximity sensor 600 because of the size of the hand or in instances where the user readjusted his or her grip. Additionally, in some instances where the minimum capacitance value and the maximum capacitance value are narrow, or separated by a small range, the capacitance values may be unreliable and noise may significantly impact finger motion. To eliminate or decrease noise from these capacitive pad(s) 602, the final normalization 1024 may determine a reliability of the capacitance values, and if a reliability is low, the weight of a capacitance value from a capacitive pad 602 is removed from the weighted sum. Therein, the capacitance values are summed and divided by the sum of the weights of the capacitive pads 602 being used.

At 1026, the process 1000 may filter and curve fit the proximity data to represent a hand gesture of the user. The filtering and curve fitting may involve linearizing the final normalization of the proximity data on the [0,1] scale to achieve a linear relationship between the proximity data and a position of a finger (e.g., curled, extended, half-way extended, etc.). For instance, the final normalization values determined at 1024 may follow an exponential curve, such that as the hand of the user comes into proximity of the controller 100, or grips the controller 100, the final normalized values exponentially increase. In other words, the summed capacitance value may be exponentially related to the proximity with the finger disposed on/around the controller 100. Linearizing the values on a [0,1] scale such that the capacitance values are correlated with a finger position may reduce sensitivity and an impact that noise may have when a finger is extended from the controller 100, as well as when a finger touches or is in close proximity to the controller 100.

As shown, the filtering and curve fitting may involve various sub-blocks to achieve final values that are utilized to generate hand gestures. At the filtering and curve fit stage 1026, the process 1000 may apply filtering before or after the curve fit. For instance, the sub-blocks may involve filtering capacitance values within a low-level range of capacitance values when the capacitive pads 602 are susceptible to noise. In other words, within a high-level capacitance range, such as when the fingers grip the controller 100 or are in close proximity to the controller 100, the capacitive pads 602 are less susceptible to noise.

The process 1000 may apply adaptive filtering at 1028 to adjust the amount of filtering performed on the capacitance values. The adaptive filtering may adaptively filter to more aggressively filter the capacitance values within the low-range of capacitance values compared to the capacitance values are within the high range of capacitance values. As shown, the adaptive filtering may involve sub-blocks 1030, 1032, and 1034. In general, the adaptive filtering at 1026 may utilize the results of sub-blocks 1030, 1032, and 1034 to determine how much noise exists in the normalized value to determine an amount of filtering to be applied to the normalized capacitance values. Determining an amount of noise that exists in the capacitance values may involve determining which capacitive pads 602 are being used to generate the capacitance values, as well as the minimum capacitance value and the maximum capacitance value for the respective capacitive pads 602. For instance, the capacitive pads 602 may have a baseline noise and if the range between the minimum capacitance value and the maximum capacitance value for a capacitive pad 602 is low, the baseline noise of the capacitive pad 602 may equate to a large amount of finger movement (i.e., baseline noise is a large fraction of the range of capacitance values the capacitive pad 602 is able to sense). Here, the signal to noise ratio may be high. Comparatively, if the range between the minimum capacitance value and the maximum capacitance value for a capacitive pad 602 is large, then the baseline noise of the capacitive pad 602 may not introduce a large amount of finger movement. In these scenarios, to reduce the noise within the capacitance values, when the range of capacitance values is small, the process 1000 may filter capacitance values more heavily than when the range of capacitance values is larger. The filtering and curve fit 1026 may be repeated for each capacitive pad 602 as each capacitive pad 602 may include respective high and low-level capacitance values. Additionally, the amount of filtering applied at 1026 may depend on which capacitive pads 602 and/or which capacitive pads 602 have been rejected (e.g., pad and finger rejection 1022).

The sum noise prediction at 1030 may filter the capacitance values based on which capacitive pads 602 are being used, the weights assigned the capacitive pads 602, as well as the respective baseline noise for the capacitive pads 602. For instance, the process 1000 may include a default capacitive pad noise at 1028, which may represent an estimated baseline noise for individual capacitive pads 602. The sum noise prediction step at 1030 may therefore determine, for those capacitive pads 602 being used, their respective baseline noise values. The sum noise prediction step may also determine the expected or predicted noise for the capacitive pads 602. For instance, if the capacitive pads 602 being used sense capacitance values over a large range (i.e., between the minimum capacitance value and the maximum capacitance value), the capacitance values may include a low amount of noise and less filtering may be applied. However, if the range of capacitance values for a capacitive pad 602 is narrow (i.e., between the minimum capacitance value and the maximum capacitance value), then the capacitance values may include a large amount of noise and the process 1000 may apply a greater amount of filtering.

The dNorm/dt at 1032 may take into consideration a change in capacitance value over time. For instance, if the received capacitance values from the capacitive pad 602 change significantly over a short period of time (e.g., one frame), the potential noise introduced within the capacitance values may be disregarded or weighted accordingly. That is, instead of filtering the capacitance values and introducing latency, if the capacitance values change over a threshold amount over a threshold amount of time, less filtering may be applied to the capacitance values. In this sense, less filtering may be applied when greater finger movement is detected and more filtering may be applied when less finger movement is detected.

The dCurl/dNorm at 1034 may filter the normalized capacitance value based on an amount of capacitance detected. For instance, in the high-range of capacitance values, where the finger grips the controller, less filtering may be applied because the noise may have less of an impact on finger position. However, at the low range of capacitance values, where the finger is displaced from the controller, or in close proximity, more filtering may be applied because small changes in capacitance values may have a significant impact on the position of the finger. Here, a small change in capacitance values may result in a large change of the finger gesture.

At sub-block 1038, the lo-pass filter may represent a tunable lo-pass mean filter that adjusts the amount of filtering on detected capacitance values. In some instances, the amount of filtering may be on a scale of [0,1] and may be based on the result of the amount of filtering determined at the adaptive filter 1028. That is, the lo-pass filter may filter the capacitance values as determined from the adaptive filtering.

At sub-block 1040, the process 1000 may curve fit the capacitance values on a [0,1] scale to associate the capacitance values with a position of the finger, or a hand animation. For each finger, the output of the curve fit may include a number for each finger, where the number indicates the finger position of each finger of the hand.

At sub-block 1042, the process 1000 may apply a backlash filter after the curve to filter changes in capacitance values that fall below a threshold. For instance, if the capacitance values do not change by a threshold amount on the [0,1] scale, the capacitance values may be filtered. Such filtering may reduce perceived finger twitching and motion by the user.

At sub-block 1044, the joint model may correspond to a hand animation (e.g., a hand skeleton). For instance, the joint model may generate a hand animation corresponding to the number assigned to individual fingers of the hand from the curve fit at 1040.

Figure 11:
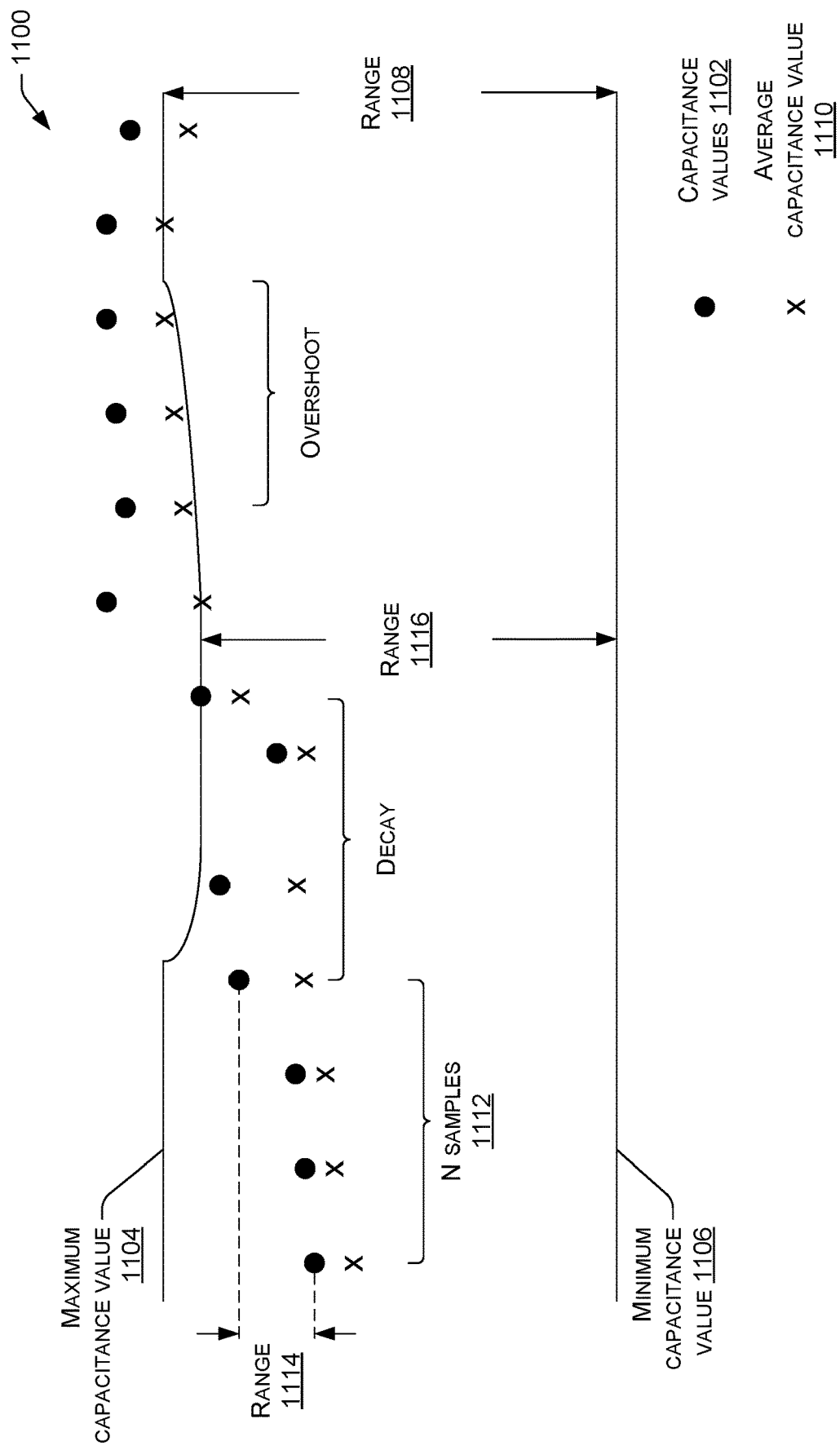
FIG. 11 depicts an example chart illustrating configuring the proximity sensor of the controller of FIG. 1 according to an example embodiment of the present disclosure.

FIG. 11 illustrates an example chart 1100 for updating a minimum capacitance value associated with a proximity sensor 600. The example chart 1100 is shown illustrating capacitance values 1102 received from a capacitive pad 602 of the proximity sensor 600. In some instances, the controller 100 may receive the capacitance values 1102 at every frame displayed in a VR environment. The capacitive pad 602 may measure the capacitance values 1102 associated with an object (e.g., finger) in proximity to the capacitive pad 602. In some instances, as the distance between the object and the capacitive pad 602 decreases, the capacitance value detected by the capacitive pad 602 may increase. Through iteratively receiving the capacitance values 1102, the controller 100 may determine a maximum capacitance value 1104, a minimum capacitance value 1106, and/or a range 1108 between the maximum capacitance value 1104 and the minimum capacitance value 1106.

In some instances, the maximum capacitance value 1104 may correspond to a capacitance value received when the object (e.g., finger) is touching the controller 100. For instance, the controller 100 may associate this capacitance value with the maximum capacitance value 1104 and a touch at the controller 100. This association may be utilized by one or more computing devices to generate image data of the user holding an object (e.g., weapon, ball, etc.). The minimum capacitance value 1106 may correspond to a capacitance value received when the object (e.g., finger) is not touching the controller 100 and is fully extended from the controller 100. For instance, in receiving the capacitance value 1102, the controller 100 may associate this capacitance value with the minimum capacitance value 1106 and the user fully extending his or her finger from the controller 100. This association may be utilized by one or more computing devices to generate image data of the user fully extending his or her finger (e.g., dropping a ball).

Additionally, in receiving the capacitance values 1102, the controller 100 may determine an average capacitance value 1110. In some instances, the average capacitance value 1110 may be determined from capacitance values from a predetermined number of past samples. For instance, the average capacitance value 1110 may be determined using the past twenty capacitance values received.

Utilizing the range 1108, the controller 100 may determine a bias, and/or a scale factor for the capacitive pad 602 to determine a relative finger position of the user between being fully extended and touching the controller 100. Throughout a gameplay experience, however, one or more factors may impact detected the capacitance values 1102. For instance, a temperature of an environment in which the controller 100 resides may decrease and/or a wetness of the user hand/finger may increase. In some instances, these factors may result in lower capacitance values 1102. To accurately detect the proximity of the object relative to the controller 100, the maximum capacitance value 1104 (or a level/limit associated therewith) may decay. In other words, the maximum capacitance value 1104 may decay to a new capacitance value to accurately detect and/or associate the capacitance values 1102(A) with a finger position of the user (e.g., using the bias, scale factor, etc.)

For instance, FIG. 11 illustrates that the maximum capacitance value 1104 may decay. In some instances, the decay may occur as a result of the controller 100 not receiving capacitance values 1102 within a certain threshold of the maximum capacitance value 1104. In some instances, if the capacitance values 1102 are not within the certain threshold of the maximum capacitance value 1104 for a predetermined number of frames, the maximum capacitance value 1104 may decay. Additionally, the maximum capacitance value 1104 may decay if the average capacitance value 1110 over a past number of N samples 1112 is not within the certain threshold of the maximum capacitance value 1104. In still other instances, the maximum capacitance 1106 value may continuously decay to converge towards the capacitance values 1102 and/or the average capacitance value 1110.

In some instances, an amount of the decay may be based at least in part on a variable decay rate, the range 1108, and/or a range 1114 determined over the past number of N samples 1112. In some instances, the variable decay rate may be substantially ten percent of the range 1108. As a result, the maximum capacitance value 1104 may gradually decay over a period of time to converge towards the detected capacitance values 1102 and/or the average capacitance value 1110. Additionally, an amount the maximum capacitance value 1104 decays may be limited such that the maximum capacitance value 1104 and the minimum capacitance value 1106 are separated by a threshold amount.

Moreover, a rate at which the maximum capacitance value 1104 decays may be based at least in part on a number of frames, the controller 100 has not received capacitance values 1102 within the threshold of the maximum capacitance value 1104. The rate at which the maximum capacitance value 1104 decays may also depend on a variability of the measured capacitance values 1102 over the past number of N samples 1112. For instance, if a large variability exists between the capacitance values 1102 detected over the past number of N samples 1112, the maximum capacitance value 1104 may decay at a faster rate, as compared to if a small a variability exists between the capacitance values 1102 detected over the past number of N samples 1112.

Accordingly, the maximum capacitance value 1104 may decay to a new value and a new bias, scale factor, and/or range 1116 may be determined.

As a result of decaying the maximum capacitance value 1104, in some instances, the controller 100 may detect capacitance values 1102 that are greater than the maximum capacitance value. That is, through continuously updating the maximum capacitance value 1104, the controller 100 may receive capacitance values 1102 that are greater than the determined maximum capacitance value. These capacitance values 1102 may "overshoot" the maximum capacitance value 1104. In such instances, if the capacitance values 1102 overshoot the maximum capacitance value 1104, or if the average capacitance value 1110 overshoots the maximum capacitance value 1104, the maximum capacitance value 1104 may "grow" or extend towards the capacitance values 1102 or the average capacitance value 1110. In such instances, the maximum capacitance value 1104 may make up for this difference. The amount and/or the rate at which the maximum capacitance value 1104 updates may be based on a growth variable (e.g., 0.2) as well as the average capacitance value 1110 detected over a past number of frames. In doing so, the handheld controller may update the maximum capacitance value 1104 and determine an updated bias, an updated scale factor, and so forth. The maximum capacitance value 1104 may continue to extend until the maximum capacitance value 1104 catches up with the capacitance values 1102 and/or the average capacitance value 1110.

Although not shown, the minimum capacitance value 1106 may similarly decay based on the capacitance values 1102 and/or the average capacitance value 1110. For instance, the minimum capacitance value 1106 may decay as a result of the controller 100 not receiving capacitance values 1102 with a threshold of the minimum capacitance value 1106 over for a threshold number of frames. In doing so, the minimum capacitance value 1106 may decay to a new capacitance value to accurately detect and/or associate the capacitance values 1102 with a finger position of the user (e.g., using the bias, scale factor, etc.). An amount or rate at which the minimum capacitance value 1106 decays may be based at least in part on a period of time the controller 100 has not received capacitance values 1102 within a threshold of the minimum capacitance value 1106. The amount the minimum capacitance value 1106 decays may be limited such that the minimum capacitance value 1106 and the maximum capacitance value 1104 are separated by a threshold amount or range. In some instances, because large amount of noise may exist within the capacitance values 1102 in the lower-range of the range 1108 (i.e., when the finger is extended from the controller 100), in some instances the minimum capacitance value 1106 may decay at a rate twice as the maximum capacitance value 1104.

Additionally, while the maximum capacitance value 1104 and the minimum capacitance value 1106 are discussed separately, the maximum capacitance value 1104 and the minimum capacitance value 1106 may decay at the same time based on the controller 100 receiving the capacitance values 1102. In turn, an updated range, an updated bias, and/or an updated scale factor may be determined for use in calibrating the capacitive pad 602 and/or normalizing capacitance values 1102 received from the capacitive pad 602.

Figure 12:
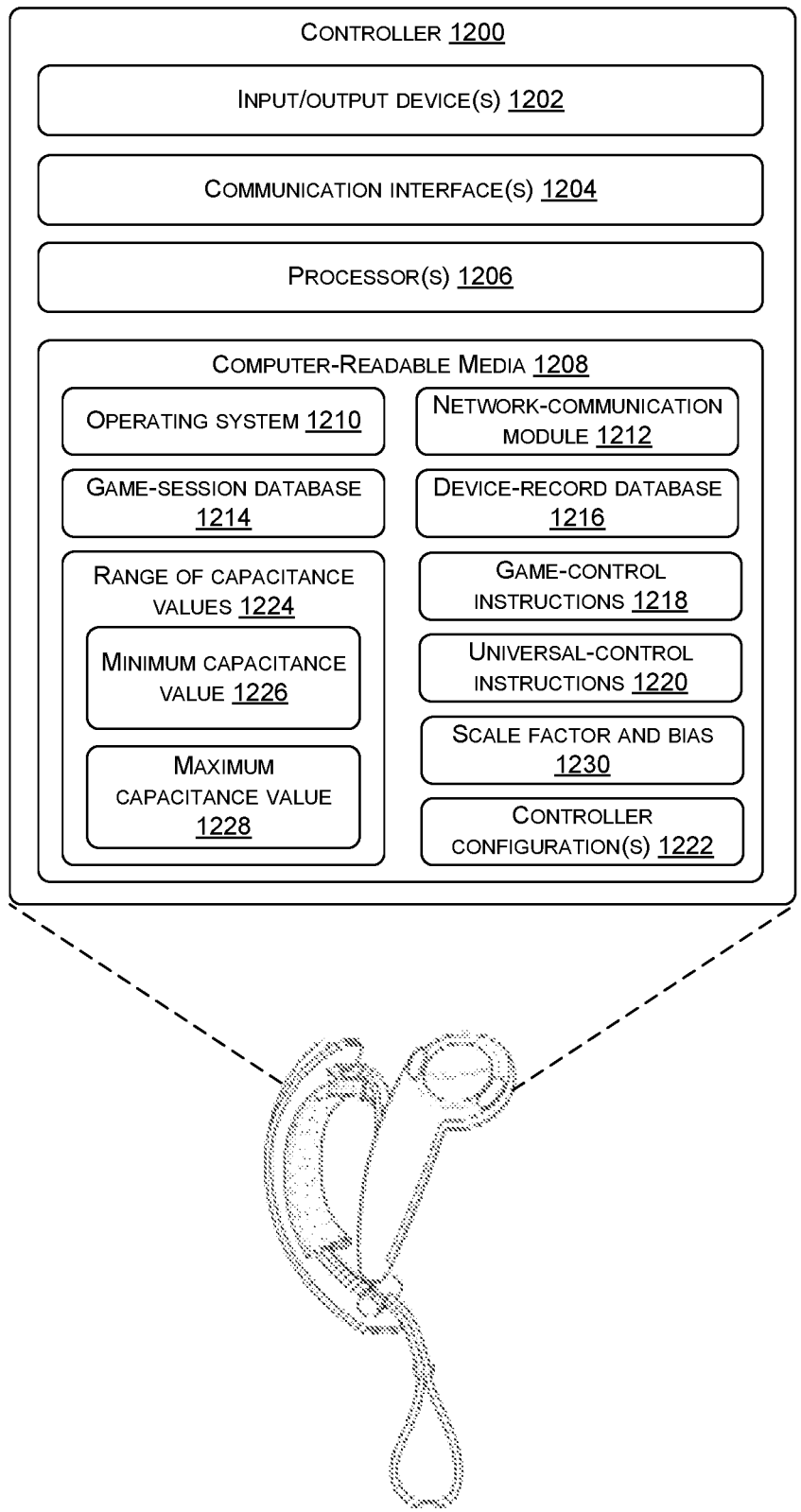
FIG. 12 depicts example components of the controller of FIG. 1 according to an example embodiment of the present disclosure.

FIG. 12 illustrates example components of a controller 1200, such as the controller 100. As illustrated, the controller 100 may include one or more input/output (I/O) devices 1202, such as the controls described above (e.g., joysticks, trackpads, triggers, etc.), a proximity sensor 600, and/or potentially any other type of input or output devices. For example, the I/O devices 1202 may include one or more microphones to receive audio input, such as user voice input. In some implementations, one or more cameras or other types of sensors (e.g., inertial measurement unit (IMU)) may function as input devices to receive gestural input, such as motion of the controller 100. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons. The output devices, meanwhile, may include a display, a light element (e.g., LED), a vibrator to create haptic sensations, a speaker(s) (e.g., headphones), and/or the like. There may also be a simple light element (e.g., LED) to indicate a state of the controller 100 (e.g., powering on).

In some instances, output by the I/O devices may be based on input received by one or more of the input devices. For example, touch sensed via the proximity sensor 600 of the controller 100 may result in the output of a haptic response by a vibrator located adjacent (e.g., underneath) the proximity sensor 600. In some instances, the output may vary based at least in part on a characteristic of a proximity of one or more objects relative to the proximity sensor 600, such as the capacitive pads 602 disposed on/within the handle 112 of the controller 100. For example, a touch input (or proximity of an object) at a first location on the handle 112 may result in a first haptic output, while a touch input (or proximity of an object) at a second location on the handle 112 may result in a second haptic output. Furthermore, a particular gesture on the handle 112 may result in a particular haptic output (or other type of output). For instance, a tap and hold gesture (detected by the proximity sensor 600) on the handle 112 may result in a first type of haptic output, while a tap and release gesture on the handle 112 may result in a second type of haptic output, while a hard tap of the handle 112 may result in a third type of haptic output. However, while a few examples are provided, the controller 100 may additionally or alternatively other types of I/O devices.

In addition, the controller 100 may include one or more communication interfaces 1204 to facilitate a wireless connection to a network and/or to one or more remote systems (e.g., a host computing device executing an application, a game console, other controllers, etc.). The communication interfaces 1204 may implement one or more of various wireless technologies, such as Wi-Fi, Bluetooth, radio frequency (RF), and so on. Additionally, or alternatively, the controller 100 may include physical ports to facilitate a wired connection to a network, a connected peripheral device, or a plug-in network device that communicates with other wireless networks.

In the illustrated implementation, the controller 100 further includes one or more processors 1206 and computer-readable media 1208. In some implementations, the processors(s) 1206 may include a central processing unit (CPU), a graphics processing unit (GPU), both CPU and GPU, a microprocessor, a digital signal processor, or other known processing units or components. Additionally, or alternatively, the functionally described herein may be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1206 may possess its own local memory, which also may store program modules, program data, and/or one or more operating systems.

The computer-readable media 1208 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1208 may be implemented as computer-readable storage media ("CRSM"), which may be any available physical media accessible by the processor(s) 1206 to execute instructions stored on the computer-readable media 1208. In one implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1206.

Several modules, such as instruction, datastores, and so forth may be stored within the computer-readable media 1208 and configured to execute on the processor(s) 1206. A few example functional modules are shown as stored in the computer-readable media 1208 and executed on the processor(s) 1206, although the same functionality may alternatively be implemented in hardware, firmware, or as a system on a chip (SOC). An operating system module 1210 may be configured to manage hardware within and coupled to the controller 100 for the benefit of other modules. In addition, the computer-readable media 1208 may store a network-communications module 1212 that enables the controller 100 to communicate, via one or more of the communication interfaces 1204, with one or more other devices, such as a personal computing device executing an application (e.g., a game application), a game console, a remote server, other controller(s), computing devices, or the like. The computer-readable media 1208 may further include a game-session database 1214 to store data associated with a game (or other application) executing on the controller 100 or on a computing device coupled to the controller 100.

The computer-readable media 1208 may also include a device record database 1216 that stores data associated with devices coupled to the controller 100, such as the personal computing device, game console, remote server, or the like.

The computer-readable media 1208 may further store game-control instructions 1218 that configure the controller 100 to function as a gaming controller, and universal-control instructions 1220 that configure the controller 100 to function as a controller of other, non-gaming devices.

The computer-readable media 1208 may additionally store controller configuration(s) 1222. The controller configuration(s) 1222 may represent or include data associated with the assignment of the capacitive pads 602 of the proximity sensor 600 to associate certain capacitive pads 602 with respective fingers of a user operating the controller 100.

The computer-readable media 1208 may additionally store data associated with a range of capacitance values 1224. The range of capacitance values 1224 may indicate a range of capacitance values detected or capable of being detected at individual capacitive pads 602 of the proximity sensor 600. For instance, through continuously receiving proximity data from the proximity sensor 600, as described hereinabove, the controller 100 may calculate and/or determine the range of capacitance values received at the capacitive pads 602. With the range of capacitance values, the computer-readable media 1208 may also store a minimum capacitance value 1226 and/or a maximum capacitance value 1228.

The computer-readable media 1208 may also store a scale factor and bias 1230. The scale factor and bias 1230 may be associated with individual capacitive pads 602 and may be determined utilizing the range of capacitance values 1224. Accordingly, utilizing the range of capacitance values 1226 and/or the scale factor and bias 1230, the controller 1200 may normalize and/or calibrate proximity data received from the proximity sensor 600.

CONCLUSION

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A controller system comprising:
   a controller having a proximity sensor configured to detect an object in proximity to, but not touching, the controller;
   one or more processors; and
   one or more non-transitory computer-readable media storing computer-executable instructions that, when executed by the one or more processors, cause the one or more processors to perform acts comprising:
      determining a range of proximity values detected by the proximity sensor, the range of proximity values including a maximum value and a minimum value;
      receiving proximity values from the proximity sensor;
      continuously adjusting at least one of the maximum value or the minimum value based at least in part on determining that one or more of the proximity values received from the proximity sensor are outside a threshold range of the at least one of the maximum value or the minimum value for a threshold period of time; and
      determining an updated range of proximity values detected by the proximity sensor based at least in part on the continuously adjusting.

2. The controller system of claim 1, wherein the continuously adjusting the at least one of the maximum value or the minimum value comprises continuously adjusting the maximum value and the minimum value.

3. The controller system of claim 1, wherein the continuously adjusting the at least one of the maximum value or the minimum value comprises continuously converging the at least one of the maximum value or the minimum value towards the proximity values received from the proximity sensor.

4. The controller system of claim 1, wherein the controller comprises a handle, and wherein the proximity sensor is disposed in or on the handle.

5. The controller system of claim 1, wherein the proximity values are received during a previous number of frames, and wherein the acts further comprise determining an average value based on the proximity values received during the previous number of frames, and wherein the continuously adjusting the at least one of the maximum value or the minimum value is based at least in part on the average value.

6. The controller system of claim 5, wherein the continuously adjusting is based on at least one of:
determining that the average value is greater than the maximum value; or
determining that the average value is less than the minimum value.

7. A method comprising:
determining a range of proximity values detected by a proximity sensor of a controller, the range of proximity of values including a maximum value and a minimum value, and the proximity sensor being configured to detect an object in proximity to, but not touching, the controller;
receiving proximity values from the proximity sensor;
determining a rate at which to continuously adjust at least one of the maximum value or the minimum value;
continuously adjusting the at least one of the maximum value or the minimum value based at least in part on the rate; and
determining an updated range of proximity values detected by the proximity sensor based at least in part on the continuously adjusting.

8. The method of claim 7, wherein the proximity sensor is included in a handle of the controller, and wherein the proximity values received from the proximity sensor correspond to the object in proximity to the handle of the controller.

9. The method of claim 7, wherein the continuously adjusting the at least one of the maximum value or the minimum value comprises continuously converging the at least one of the maximum value or the minimum value towards the proximity values received from the proximity sensor.

10. The method of claim 7, wherein the continuously adjusting the at least one of the maximum value or the minimum value comprises continuously adjusting the maximum value and the minimum value.

11. The method of claim 10, wherein:
the determining the rate comprises determining a first rate at which to continuously adjust the maximum value;
the method further comprises determining a second rate at which to continuously adjust the minimum value;
the continuously adjusting the maximum value is based at least in part on the first rate; and
the continuously adjusting the minimum value is based at least in part on the second rate.

12. The method of claim 11, wherein:
the first rate is determined based at least in part on a variability of the proximity values received during a predetermined number of previous frames; and
the second rate is determined based at least in part on the variability of the proximity values received during the predetermined number of previous frames.

13. The method of claim 7, wherein the proximity values are received during a previous number of frames, the method further comprising determining an average value based on the proximity values received during the previous number of frames, and wherein the continuously adjusting the at least one of the maximum value or the minimum value is based at least in part on the average value.

14. The method of claim 13, wherein the continuously adjusting the at least one of the maximum value or the minimum value based at least in part on the average value comprises continuously converging the at least one of the maximum value or the minimum value towards the average value.

15. A system comprising:
a controller having a proximity sensor configured to detect an object in proximity to, but not touching, the controller;
one or more processors; and
one or more non-transitory computer-readable media storing computer-executable instructions that, when executed by the one or more processors, cause the one or more processors to perform acts comprising:
determining a range of proximity values associated with the proximity sensor, the range of proximity values including a maximum value and a minimum value;
receiving proximity values from the proximity sensor;
determining a rate at which to continuously adjust at least one of the maximum value or the minimum value;
continuously adjusting the at least one of the maximum value or the minimum value based at least in part on the rate; and
determining an updated range of proximity values associated with the proximity sensor based at least in part on the continuously adjusting.

16. The system of claim 15, wherein the continuously adjusting the at least one of the maximum value or the minimum value comprises continuously adjusting the maximum value and the minimum value.

17. The system of claim 16, wherein:
the continuously adjusting the maximum value is based at least in part on determining that one or more of the proximity values received from the proximity sensor are outside a first threshold range of the maximum value for a threshold period of time; and
the continuously adjusting the minimum value is based at least in part on determining that one or more of the proximity values received from the proximity sensor are outside a second threshold range of the minimum value for the threshold period of time.

18. The system of claim 16, wherein:
the determining the rate comprises determining a first rate at which to continuously adjust the maximum value;
the acts further comprise determining a second rate at which to continuously adjust the minimum value;
the continuously adjusting the maximum value is based at least in part on the first rate; and
the continuously adjusting the minimum value is based at least in part on the second rate.

19. The system of claim 15, wherein the controller comprises a handle, and wherein the proximity sensor is disposed in or on the handle.

20. The system of claim 15, wherein the proximity values are received during a previous number of frames, and wherein the acts further comprise determining an average value based on the proximity values received during the previous number of frames, and wherein the continuously adjusting the at least one of the maximum value or the minimum value is based at least in part on the average value.

* * * * *